(12) United States Patent
Katsurahira

(10) Patent No.: US 11,216,087 B2
(45) Date of Patent: Jan. 4, 2022

(54) POSITION DETECTING DEVICE AND POSITION INDICATOR THEREOF

(71) Applicant: Wacom Co., Ltd., Saitama (JP)

(72) Inventor: Yuji Katsurahira, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/950,004

(22) Filed: Apr. 10, 2018

(65) Prior Publication Data
US 2018/0232070 A1    Aug. 16, 2018

Related U.S. Application Data

(63) Continuation of application No. 13/923,213, filed on Jun. 20, 2013, now abandoned.

(30) Foreign Application Priority Data

Aug. 8, 2012  (JP) ................................. 2012-176102

(51) Int. Cl.
  *G06F 3/0354*   (2013.01)
  *G06F 3/044*    (2006.01)
(52) U.S. Cl.
  CPC ........ *G06F 3/03545* (2013.01); *G06F 3/0441* (2019.05); *G06F 3/0442* (2019.05); *G06F 3/0446* (2019.05); *G06F 2203/04104* (2013.01)
(58) Field of Classification Search
  None
  See application file for complete search history.

(56) References Cited

U.S. PATENT DOCUMENTS

| | | | |
|---|---|---|---|
| 4,577,057 A | 3/1986 | Blesser | |
| 4,975,546 A | 12/1990 | Craig | |
| 5,528,002 A | 6/1996 | Katabami | |
| (Continued) | | | |

FOREIGN PATENT DOCUMENTS

| | | |
|---|---|---|
| CN | 102147675 B | 1/2016 |
| DE | 20 2012 102 274 U1 | 9/2012 |
| (Continued) | | |

OTHER PUBLICATIONS

Extended European Search Report, dated Dec. 14, 2015, for European Application No. 13179675.7-1972 / 2696268, 9 pages.

*Primary Examiner* — Benjamin X Casarez
(74) *Attorney, Agent, or Firm* — Seed IP Law Group LLP

(57) ABSTRACT

A method is disclosed to detect a tilt angle of a pen-shaped position indicator relative to a sensor surface of a tablet. The position indicator includes a first pen electrode and a second pen electrode. The sensor surface includes X electrodes and Y electrodes that intersect each other. The position indicator transmits a first signal from the first pen electrode and a second signal from the second pen electrode. The tablet detects a first signal intensity level V1 of the first signal based on a highest signal level Vpx1 detected in one of the X electrodes in response to the first signal, and detects a second signal intensity level V2 of the second signal based on a highest signal level Vpx2 detected in one of the X electrodes in response to the second signal. The tablet determines a tilt angle of the pen-shaped position indicator relative to the sensor surface based on a difference between the first signal intensity level V1 and the second signal intensity level V2.

15 Claims, 20 Drawing Sheets

(56) References Cited

U.S. PATENT DOCUMENTS

| | | |
|---|---|---|
| 5,644,108 A | 7/1997 | Katsurahira et al. |
| 5,736,980 A * | 4/1998 | Iguchi .................. G06F 3/03545 178/20.03 |
| 5,914,710 A * | 6/1999 | Chen ........................ G06F 3/046 178/19.04 |
| 8,199,132 B1 * | 6/2012 | Oda .................... G06F 3/03545 178/19.03 |
| 8,648,837 B1 | 2/2014 | Tran et al. |
| 9,110,543 B1 * | 8/2015 | Dabell .................. G06F 3/0442 |
| 2003/0067427 A1 * | 4/2003 | Comiskey ............. G02F 1/1345 345/84 |
| 2007/0146351 A1 * | 6/2007 | Katsurahira ........ G06F 3/03545 345/179 |
| 2009/0065269 A1 | 3/2009 | Katsurahira |
| 2009/0166100 A1 | 7/2009 | Matsubara |
| 2010/0051356 A1 | 3/2010 | Stern et al. |
| 2010/0085325 A1 | 4/2010 | King-Smith et al. |
| 2010/0155153 A1 | 6/2010 | Zachut |
| 2010/0207607 A1 | 8/2010 | Katsurahira et al. |
| 2011/0090146 A1 | 4/2011 | Katsurahira |
| 2011/0154950 A1 | 6/2011 | Cao et al. |
| 2011/0175599 A1 | 7/2011 | Liu |
| 2011/0193776 A1 | 8/2011 | Oda et al. |
| 2012/0044140 A1 | 2/2012 | Koyama et al. |
| 2012/0154340 A1 | 6/2012 | Vuppu et al. |
| 2012/0194484 A1 | 8/2012 | Lehman |
| 2012/0223919 A1 | 9/2012 | Lin et al. |
| 2012/0256830 A1 * | 10/2012 | Oda .................... G06F 3/03545 345/157 |
| 2012/0327042 A1 | 12/2012 | Harley et al. |
| 2013/0057505 A1 * | 3/2013 | Yu ........................... G06F 3/046 345/174 |
| 2013/0088465 A1 | 4/2013 | Geller et al. |
| 2013/0106717 A1 * | 5/2013 | Sundara-Rajan ... G06F 3/03545 345/173 |
| 2013/0106718 A1 | 5/2013 | Sundara-Rajan |
| 2013/0169601 A1 * | 7/2013 | Mo ......................... G06F 3/038 345/179 |
| 2013/0207938 A1 * | 8/2013 | Ryshtun ............... G06F 3/0416 345/179 |
| 2013/0278550 A1 * | 10/2013 | Westhues ............. G06F 3/0446 345/174 |
| 2013/0300670 A1 | 11/2013 | Besperstov et al. |
| 2014/0002422 A1 | 1/2014 | Stern et al. |
| 2014/0035883 A1 | 2/2014 | Mercea et al. |
| 2015/0338930 A1 | 11/2015 | Hara |
| 2017/0068345 A1 | 3/2017 | Barel |

FOREIGN PATENT DOCUMENTS

| | | |
|---|---|---|
| EP | 2 219 104 A2 | 8/2010 |
| JP | 4-96212 A | 3/1992 |
| JP | 8-30374 A | 2/1996 |
| JP | 2000-99256 A | 4/2000 |
| WO | 2011/154950 A1 | 12/2011 |

* cited by examiner

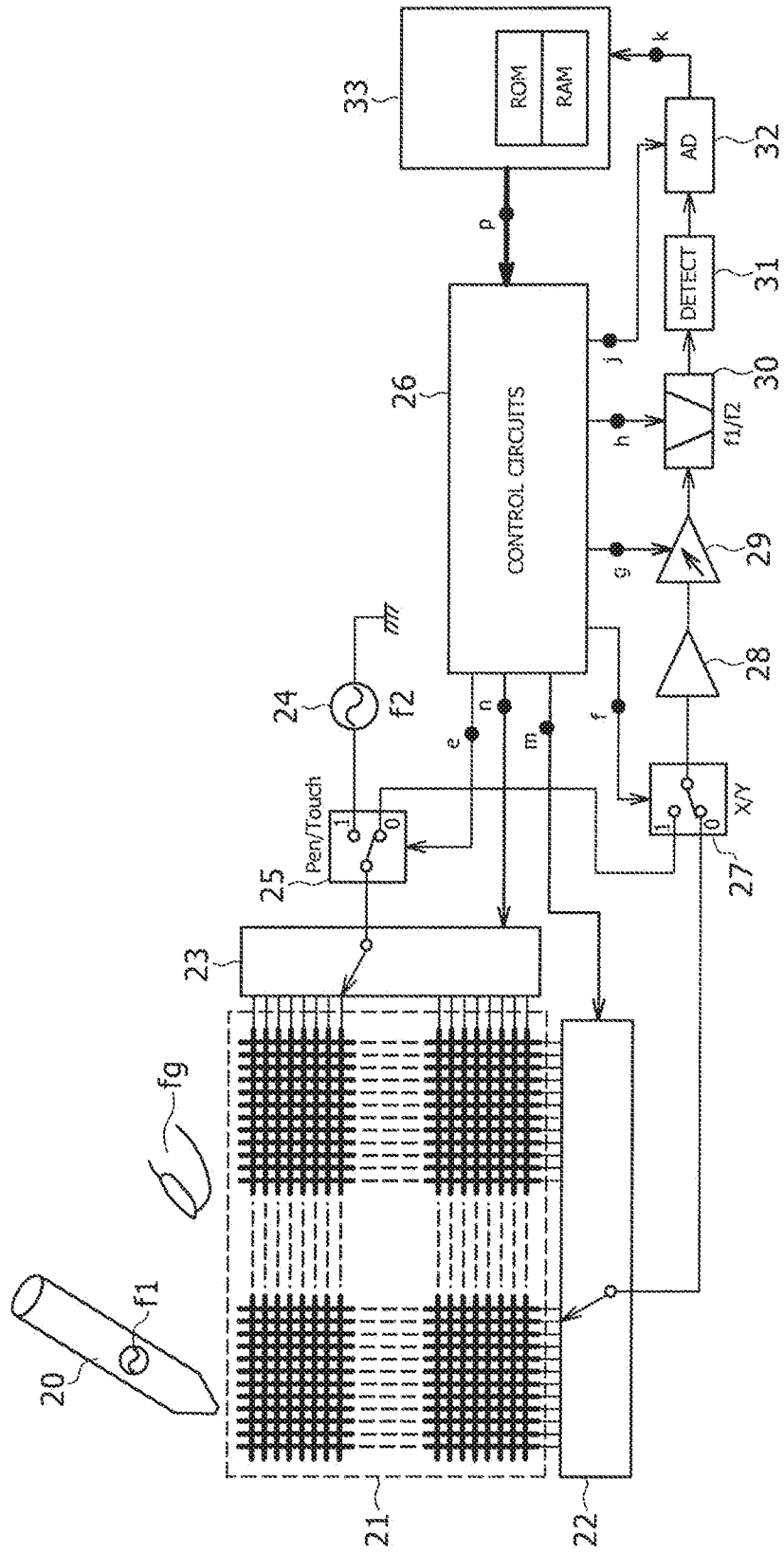
F I G. 5

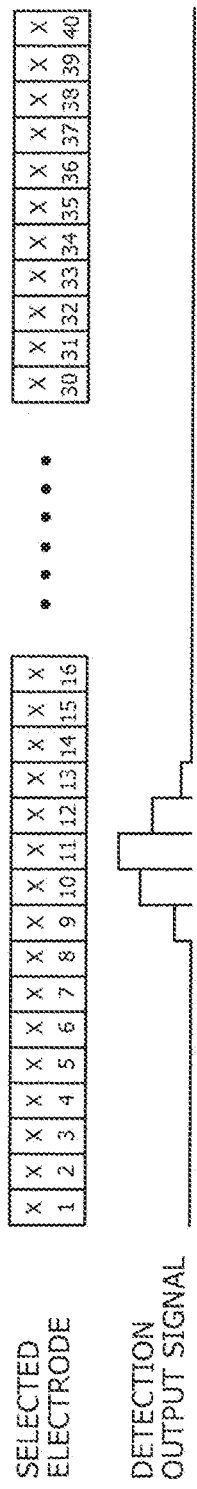

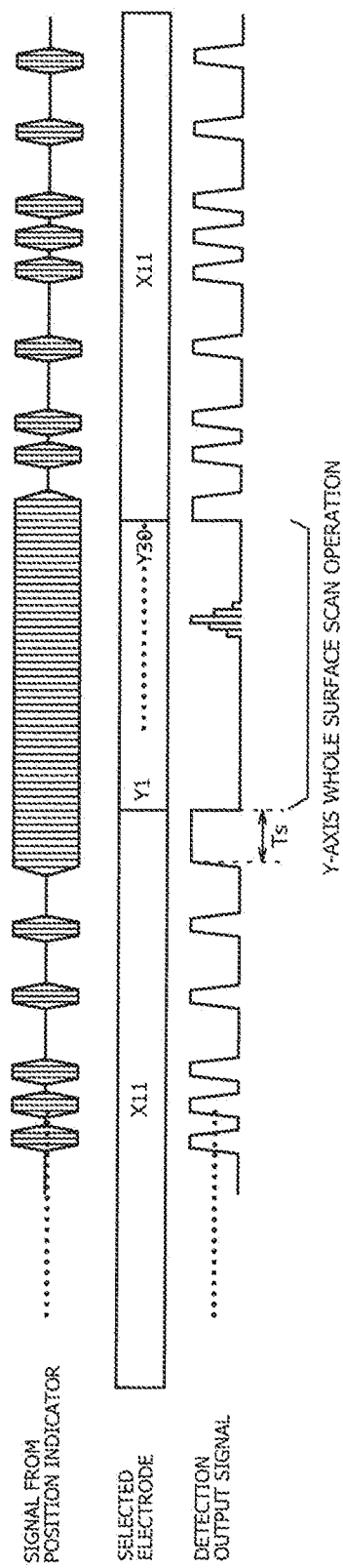

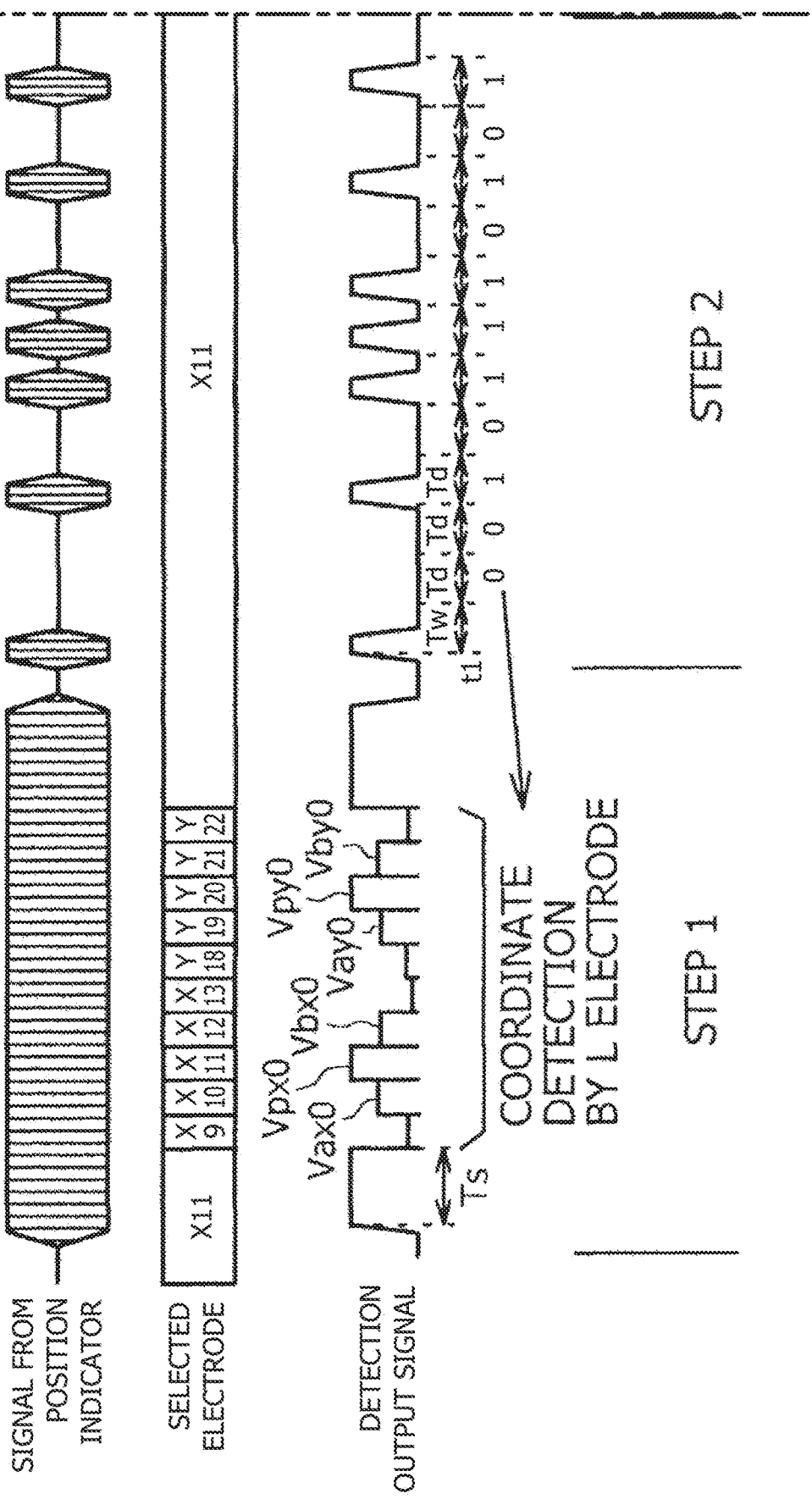

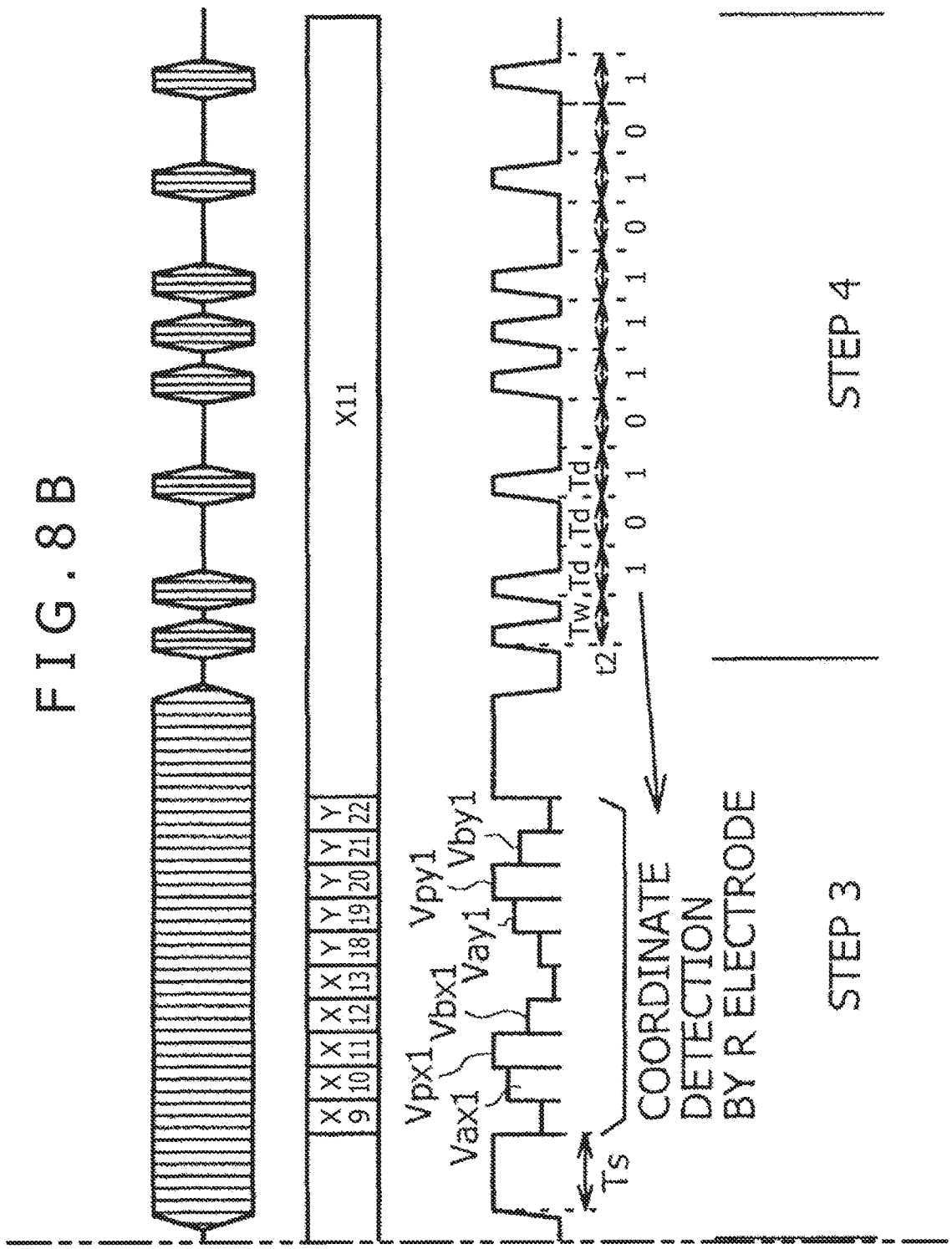

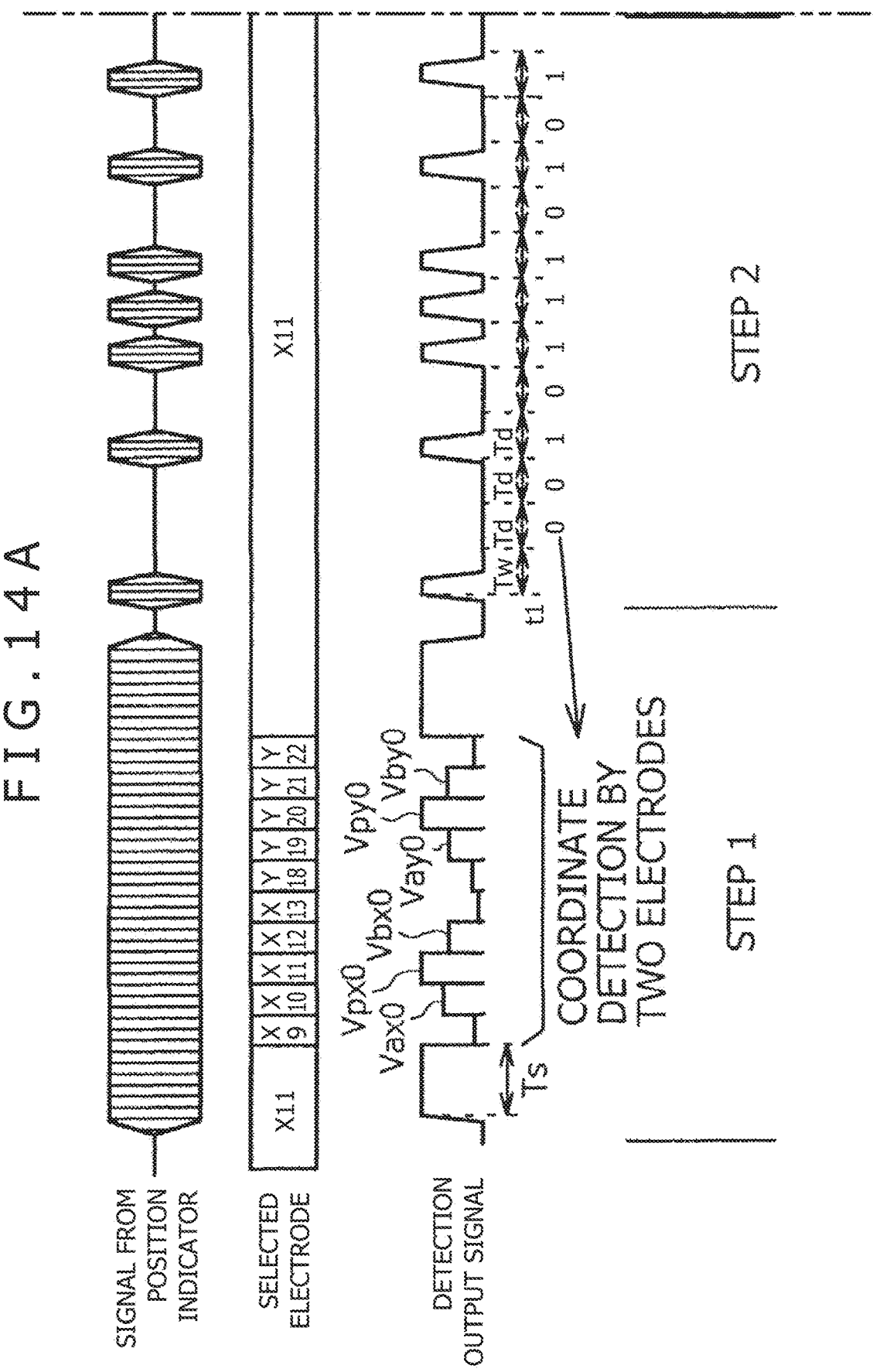

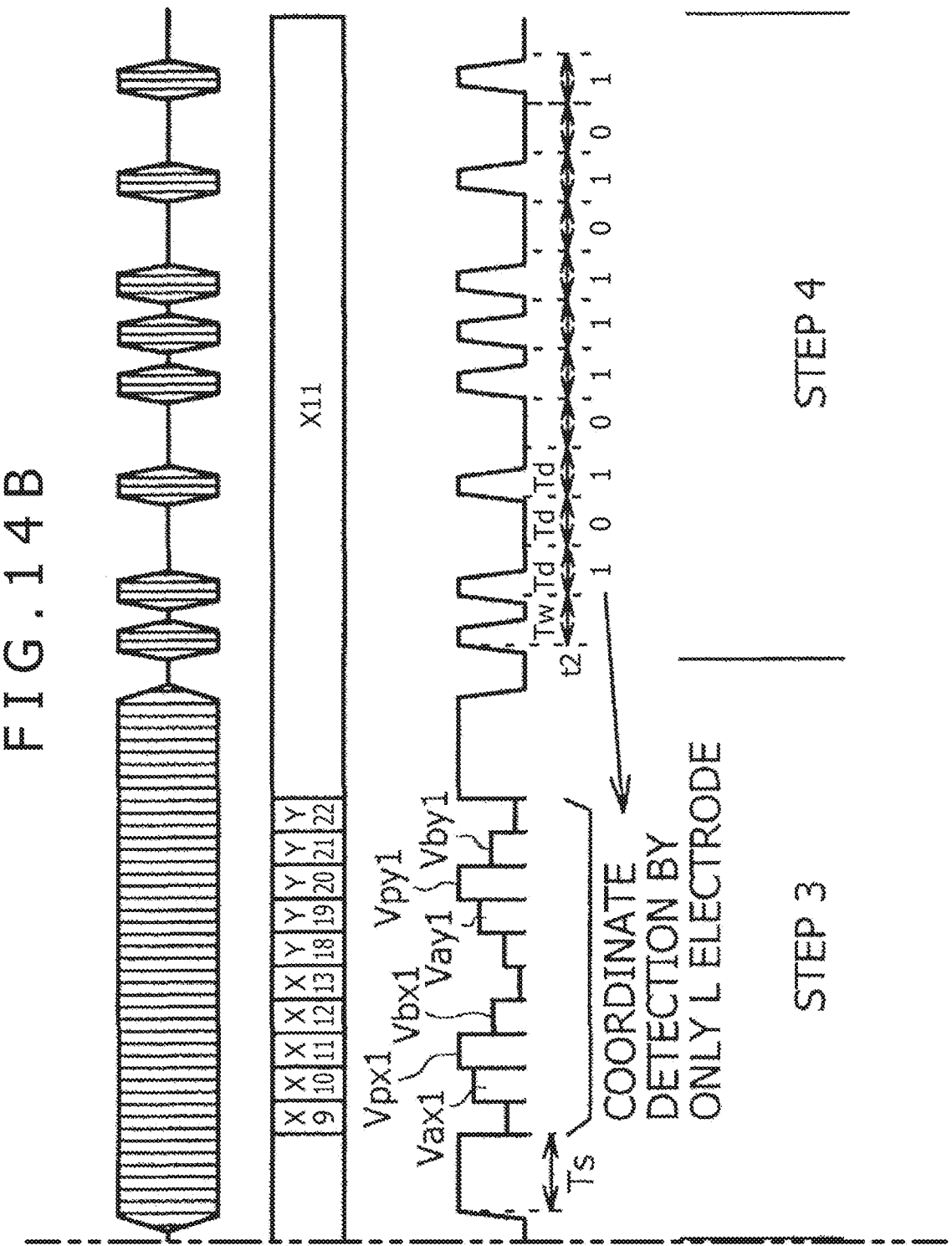

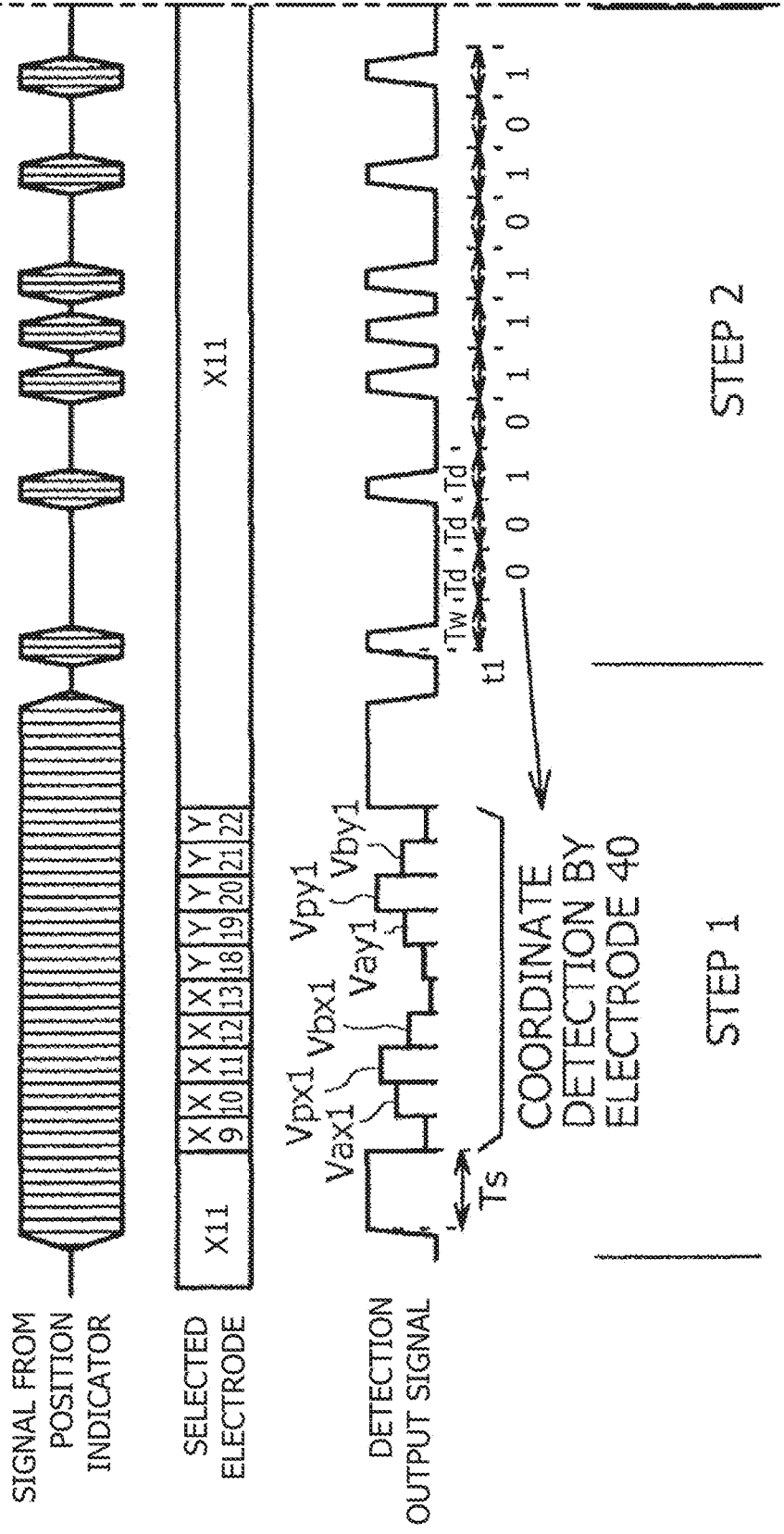

POSITION DETECTING DEVICE AND POSITION INDICATOR THEREOF

CROSS-REFERENCE TO RELATED APPLICATION

The present application claims priority under 35 U.S.C. 119(a) to Japanese Patent Application No. 2012-176102, filed Aug. 8, 2012, which is incorporated by reference herein.

BACKGROUND

Technical Field

The present invention relates to position detecting devices and position indicators thereof, and particularly to a position detecting device capable of detecting a tilt of a position indicator having a pen shape, and/or a rotation angle of the position indicator about an axis defined by the perpendicular direction to a tablet surface, and a position indicator thereof.

Description of the Related Art

As this type of device, a position detecting device of the electromagnetic induction system is disclosed in Patent Document 1 (Japanese Patent Laid-open No. Hei 8-30374). According to an embodiment example of Patent Document 1, two magnetic cores are juxtaposed at the tip portion of a position indicator having a pen shape, and a control coil wound around only one magnetic core and a transmission coil that is so wound as to bundle two magnetic cores are provided. Both ends of the control coil are controlled to the on- or off-state by an electronic switch. Based on this, the distribution of magnetic flux made by a current flowing in the transmission coil is controlled to calculate a rotation angle of the position indicator about the pen axis (aligned with the perpendicular direction to the tablet surface), which is obtained as two coordinate positions in the position detecting device (hereinafter referred to as a "tablet" in this specification).

In another embodiment example of Patent Document 1, three magnetic cores are juxtaposed at the tip portion of a position indicator having a pen shape, and three control coils wound around the respective magnetic cores and a transmission coil that is so wound as to bundle three magnetic cores are provided. By controlling the respective control coils similarly, a tilt of the position indicator relative to the tablet is calculated.

SUMMARY OF THE INVENTION

The pen-shaped position indicator of the above-described Patent Document 1 has a problem that the pen is thick because two magnetic cores are juxtaposed at the tip part. Attempting to thin the magnetic cores to solve this problem causes the following problems.

As a first problem, the distance between the centers of two magnetic cores is shortened and thus the distance between two coordinates detected by the tablet is also shortened. This lowers the resolution and accuracy in calculation of a rotation angle. This is attributed also to the switch to control the control coil. This analog switch is configured by a semiconductor circuit and therefore it is difficult to sufficiently lower the resistance value when it is turned on. Accordingly, it is difficult to sufficiently suppress magnetic flux passing through the magnetic core surrounded by the control coil. Therefore, two coordinates detected by the tablet are obtained as values closer to each other than the actual core positions.

A second problem in thinning the magnetic cores is that shock due to, e.g., dropping of the pen breaks the core more easily. That the use of this kind of device is shifting to portable tablets in recent years is also one of the reasons why demands for slimmer pens are increasing.

Another problem (third problem) of the position detecting device described in Patent Document 1 is that integration with (finger) touch detection is difficult. In recent years, multi-touch input of the electrostatic induction system has come to be widely used and demands for a tablet device allowing both multi-touch input (by a finger) and pen input are increasing. However, in contrast to a tablet of the electrostatic induction system, which uses a sensor obtained by arranging electrodes along the X direction and the Y direction, the tablet of the electromagnetic induction system of Patent Document 1 needs to have a sensor obtained by arranging loop coils and therefore it is difficult to provide the tablet sensor as a sensor compatible with both multi-touch input and pen input.

BRIEF DESCRIPTION OF THE SEVERAL VIEWS OF THE DRAWINGS

According to aspects of the invention, all of the above-described first, second, and third problems are solved. Specifically, according to a first aspect, a thin position indicator is provided whose rotation angle and tilt relative to the tablet surface can be accurately obtained.

According to a second aspect, a tough (durable) position indicator is provided that is not easily broken due to shock of, e.g., being dropped even when it is made to have a thin profile.

Figure 1:
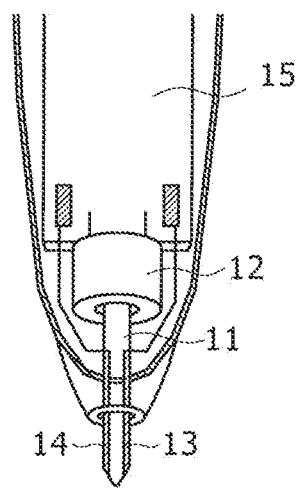

According to a third aspect, a position detecting device is provided, in which a sensor part of a touch panel based on the electrostatic coupling system can be used also as a tablet part.

According to an exemplary embodiment, a position detecting device is provided that uses electrostatic coupling between a tablet and a position indicator. In the case of using electromagnetic induction as in the invention described in Patent Document 1 described above, if the coil of the position indicator is thinned, not only the accuracy of detection of coordinates and rotation angle is significantly lowered but also a core material as the core of the coil is easily broken. The present invention makes improvements for the position detecting device of the electrostatic coupling system, in which a coil does not need to be used in the position indicator, and has the following configuration.

The position indicator includes a signal generator that generates an alternating-current signal, a plurality of electrodes disposed at a position indicating part (e.g., a pen tip part), a switch circuit that supplies the alternating-current signal to selected one(s) of the electrodes based on a predetermined electrode-selection pattern, and a pattern information transmitter that transmits, to the tablet, pattern information indicating a set predetermined pattern when the pattern is switched by the switch circuit.

The tablet includes a plurality of electrodes disposed in a flat surface manner and a signal position detector that obtains the coordinate position of the alternating-current signal transmitted from said selected one(s) of the electrodes on the tablet surface based on distribution of the level of a signal induced in each of the tablet electrodes disposed in the flat surface manner. The tablet further includes a pattern information receiver that receives the pattern information transmitted from the position indicator, and a rotation angle calculator that calculates a rotation angle of the position indicator about the perpendicular direction to the tablet surface based on a plurality of coordinate positions obtained according to the received pattern information.

Furthermore, as another mode of the present invention, the present invention has the following configuration in conjunction with the above-described configuration.

In the position indicator, at least three electrodes are provided at the position indicating part (e.g., the pen tip part) and at least three kinds of predetermined patterns are provided as electrode-selection patterns selectable by the switch circuit.

The tablet includes the plurality of electrodes disposed in a flat surface manner and the signal position detector that obtains the coordinate position of the alternating-current signal transmitted from said selected one(s) of the electrodes on the tablet surface based on distribution of the level of a signal induced in each of the plurality of electrodes disposed in the flat surface manner by the alternating-current signal transmitted from the position indicator. The tablet further includes the pattern information receiver that receives the pattern information transmitted from the position indicator, and a tilt angle calculator that calculates a tilt angle of the position indicator relative to the tablet surface based on at least three coordinate positions and at least three signal intensities obtained according to the at least three kinds of predetermined patterns indicated by the pattern information received by the pattern information receiver.

According to embodiments of the present invention, the plural electrodes are provided at the position indicating part (e.g., pen tip part) of the position indicator and the driven electrode(s) is switched time-wise serially. This allows for determining a rotation angle of the position indicator about the perpendicular direction to the tablet surface as well as a tilt of the position indicator relative to the tablet surface.

According to embodiments of the present invention, electrostatic coupling with the tablet is used. Thus, the position indicator, whose rotation angle and tilt can be obtained, can be realized in a thin profile.

According to embodiments of the present invention, a magnetic material such as a ferrite core does not need to be used for the position indicator. Therefore, even when the position indicator, whose rotation angle and tilt can be obtained, is formed into a thin shape, the position indicator is not easily broken due to shock from, e.g., being dropped.

According to embodiments of the present invention, a coordinate position is obtained by electrostatic coupling with the tablet. Therefore, the tablet sensor can be used commonly as the sensor for a touch panel of the electrostatic system, while at the same time achieving a position indicator whose rotation angle and tilt can be obtained.

BRIEF DESCRIPTION OF THE SEVERAL VIEWS OF THE DRAWINGS

Figure 2:
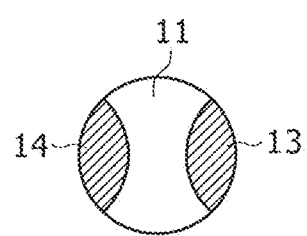
Figure 3:
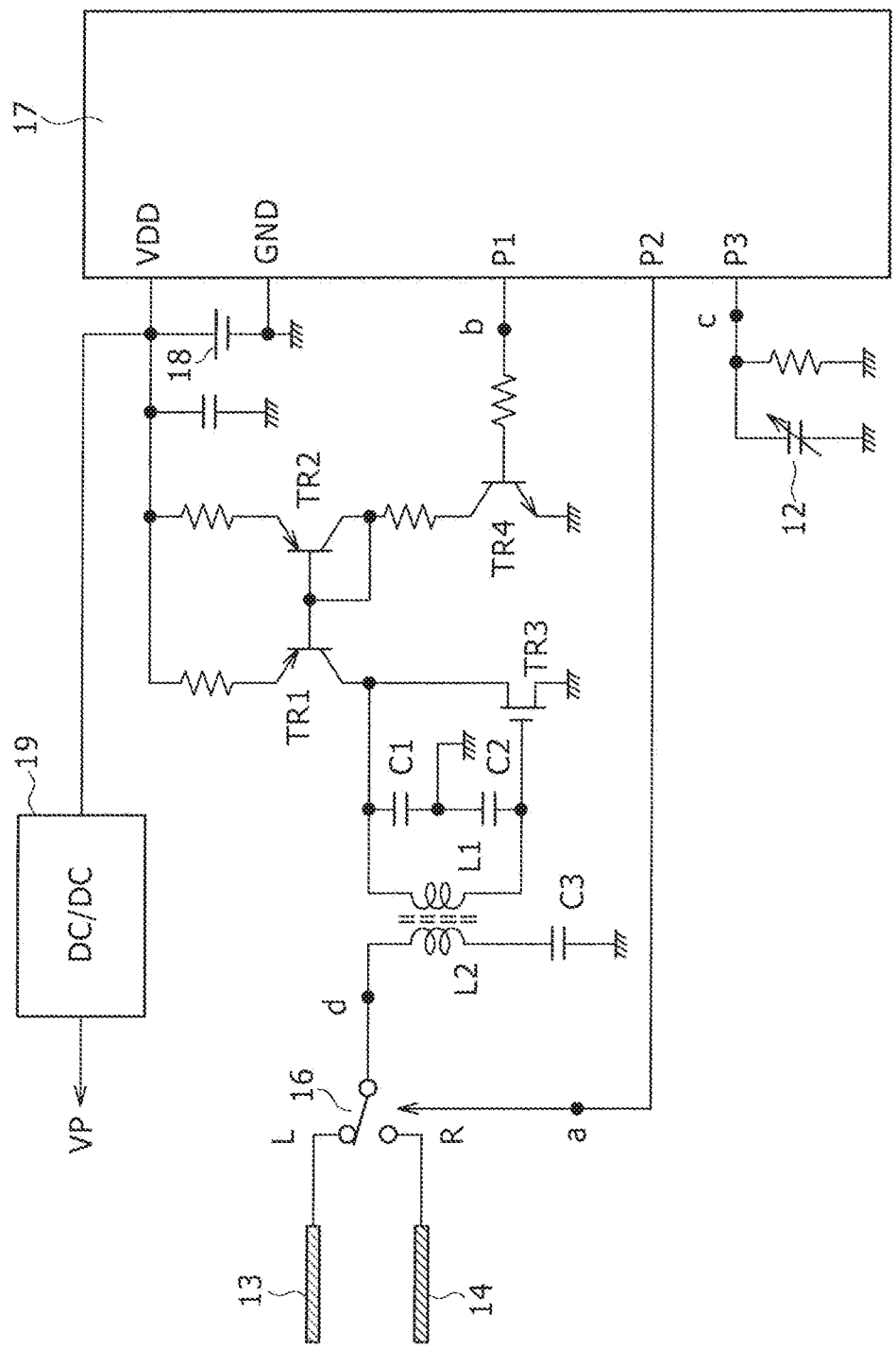
Figure 4:
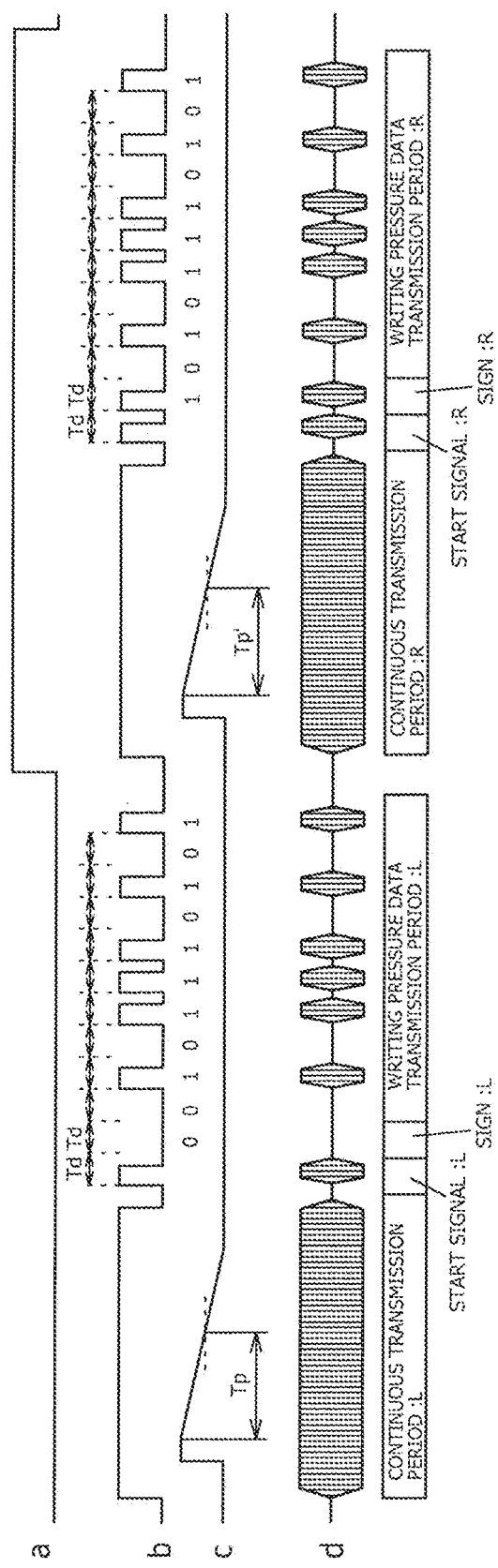
Figure 9:
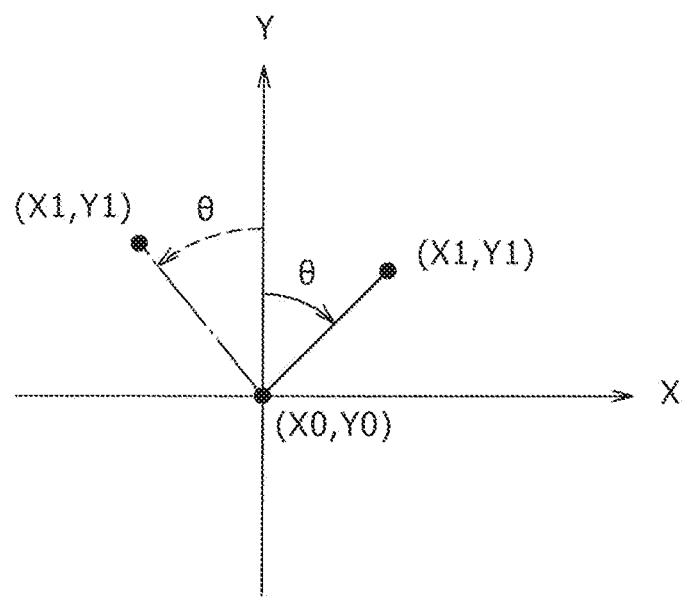
Figure 10:
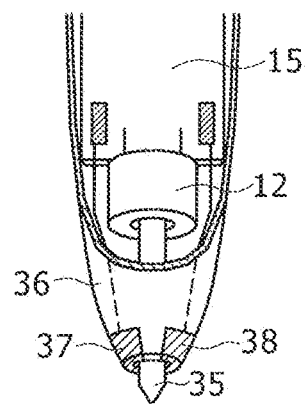
Figure 11:
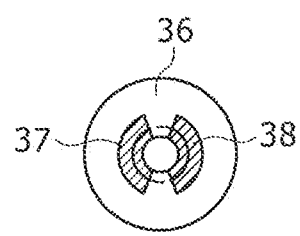
Figure 12:
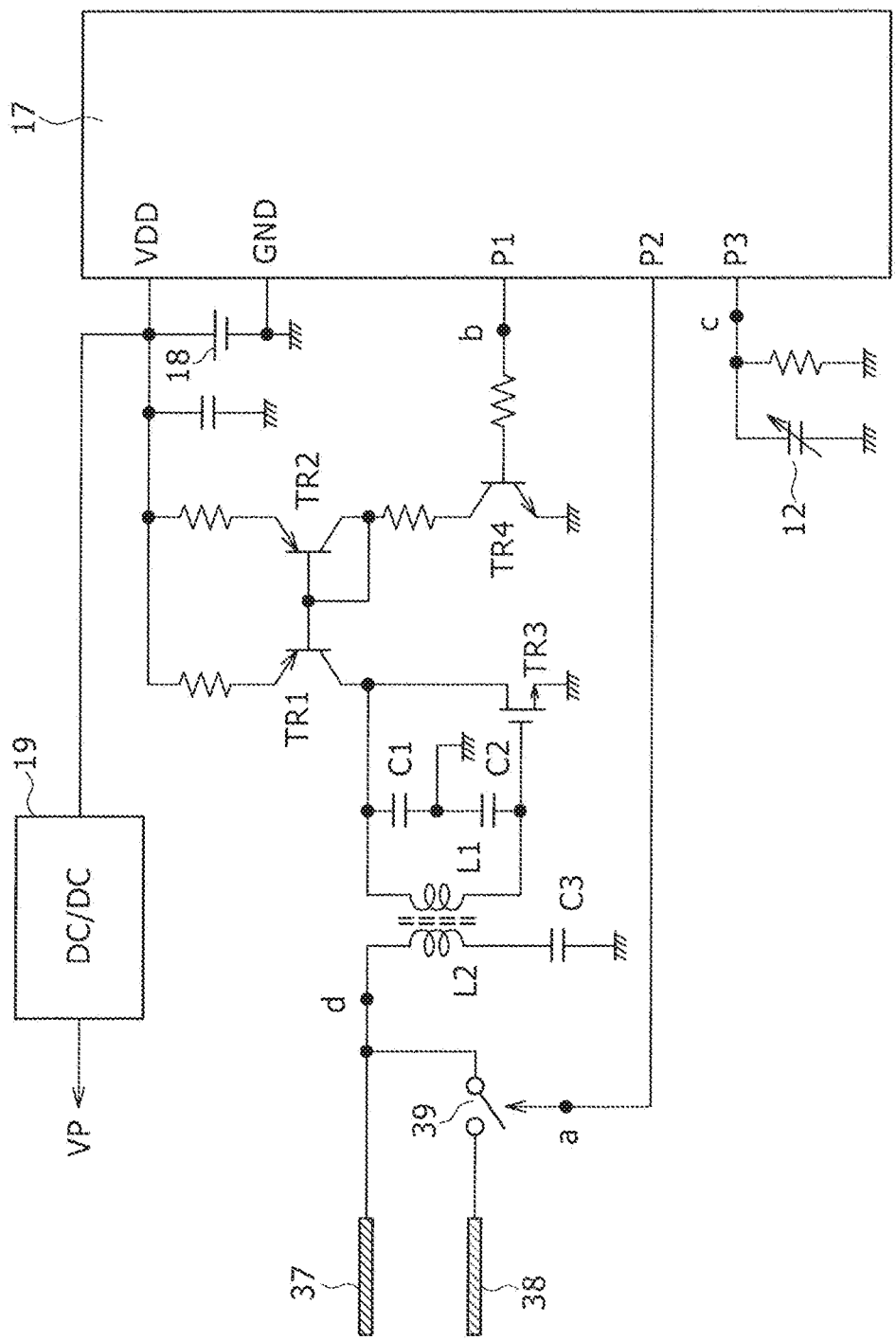
Figure 13:
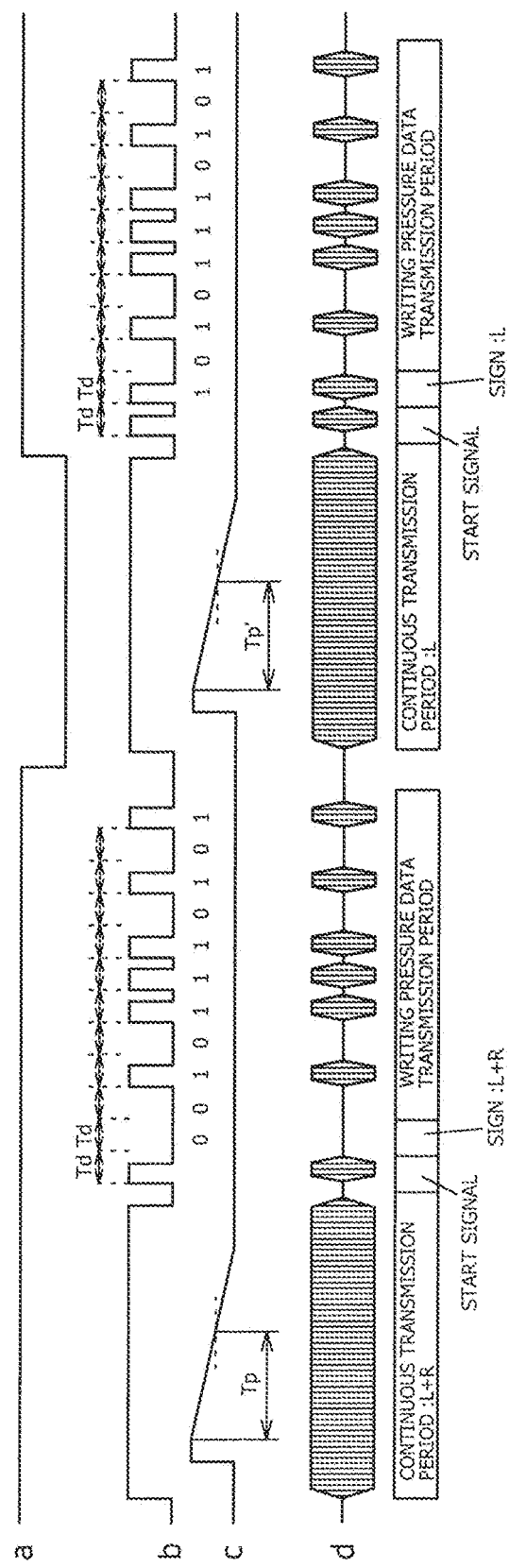
Figure 15:
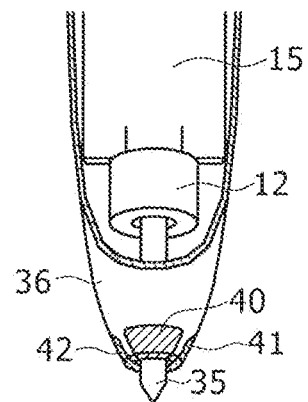
Figure 16:
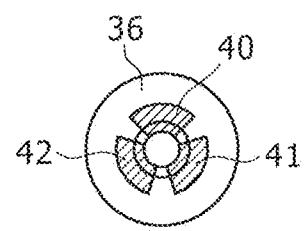
Figure 17:
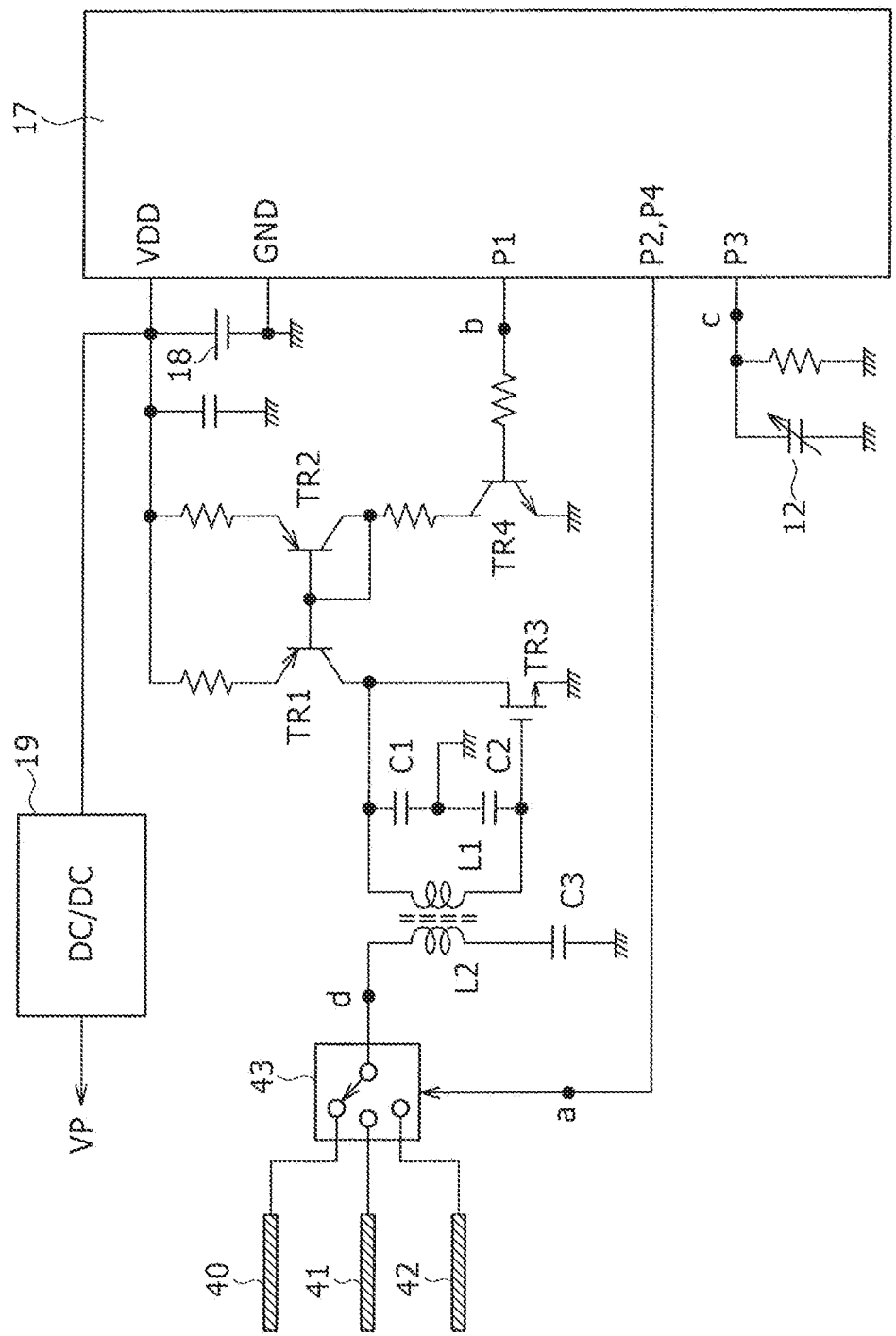
Figure 18:
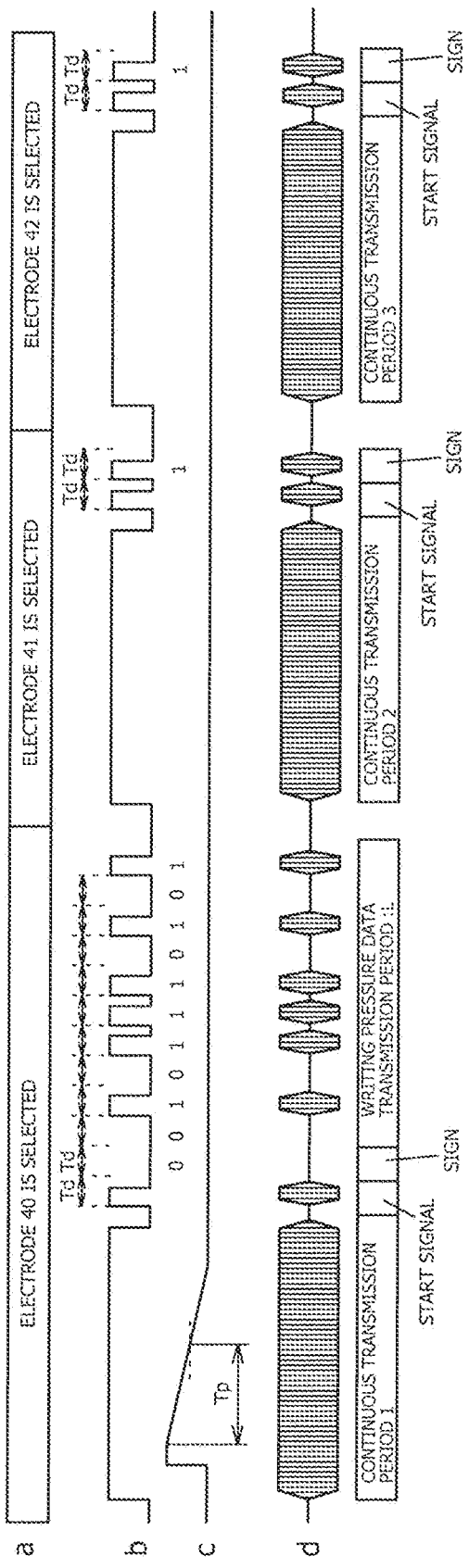
Figure 19B:
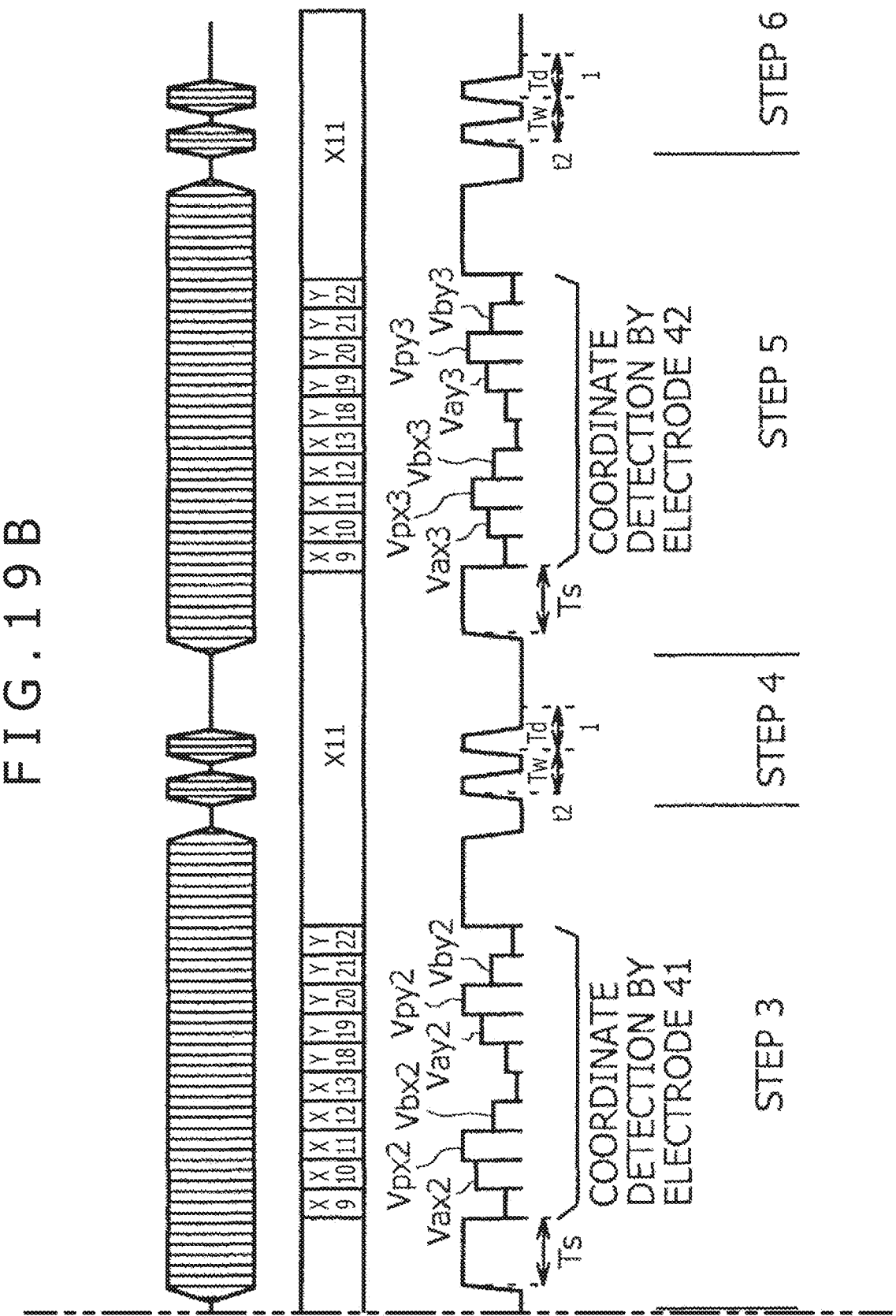
Figure 20:
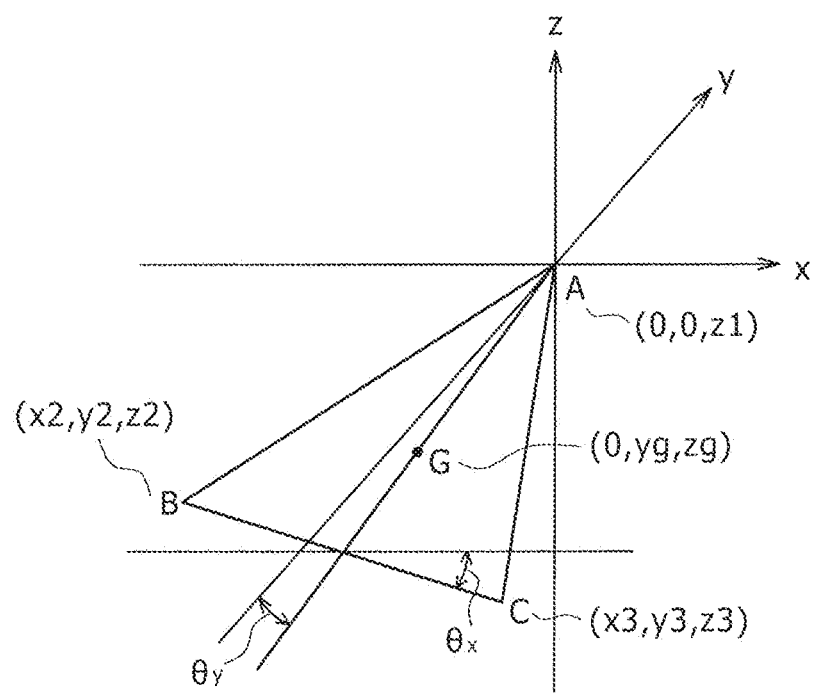
Figure 21:
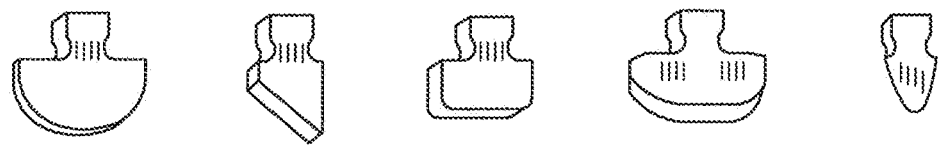

FIG. 1 is a structural diagram of a position indicating part in a position indicator of a first embodiment example of the present invention;

FIG. 2 is a sectional view of a core in the position indicator of the first embodiment example of the present invention;

FIG. 3 is a circuit configuration diagram of the position indicator of the first embodiment example of the present invention;

FIG. 4 is a diagram for explaining the operation of the position indicator of the first embodiment example of the present invention;

FIG. 5 is a configuration diagram of a tablet;

FIG. 6 is a diagram for explaining X-axis whole surface scan operation in the tablet;

FIG. 7 is a diagram for explaining transition operation to partial scan in the tablet;

FIGS. 8A-8B are diagrams that together constitute a single diagram of FIG. 8 for explaining partial scan operation in the tablet of the first embodiment example of the present invention;

FIG. 9 is a diagram for explaining the principle of rotation angle measurement;

FIG. 10 is a structural diagram of a position indicating part in a position indicator of a second embodiment example of the present invention;

FIG. 11 is a diagram showing the arrangement of electrodes in the position indicator of the second embodiment example of the present invention;

FIG. 12 is a circuit configuration diagram of the position indicator of the second embodiment example of the present invention;

FIG. 13 is a diagram for explaining the operation of the position indicator of the second embodiment example of the present invention;

FIGS. 14A-14B are diagrams that together constitute a single diagram of FIG. 14 for explaining partial scan operation in a tablet of the second embodiment example of the present invention;

FIG. 15 is a structural diagram of a position indicating part in a position indicator of a third embodiment example of the present invention;

FIG. 16 is a diagram showing the arrangement of electrodes in the position indicator of the third embodiment example of the present invention;

FIG. 17 is a circuit configuration diagram of the position indicator of the third embodiment example of the present invention;

FIG. 18 is a diagram for explaining the operation of the position indicator of the third embodiment example of the present invention;

FIGS. 19A-19B are diagrams that together constitute a single diagram of FIG. 19 for explaining partial scan operation in a tablet of the third embodiment example of the present invention;

FIG. 20 is a diagram for explaining the principle of measurement of a tilt of the position indicator of the third embodiment example of the present invention; and FIG. 21 is a diagram for explaining examples of other shapes of the tip part of the position indicator.

DETAILED DESCRIPTION

Three embodiment examples will be specifically described below as position detecting devices and position indicators thereof according to embodiments of this invention with reference to the drawings.

First Embodiment Example

FIG. 1 is a diagram showing the structure of a position indicating part in a position indicator of a first embodiment example according to the present invention. In FIG. 1, numeral 11 denotes a core that transmits pressure applied to the pen tip and it is molded by an insulating material such as plastic. Numeral 12 denotes a variable-capacitance capacitor whose capacitance changes depending on the writing pressure applied via the core 11 and, e.g., such as the one disclosed in Japanese Patent Laid-open No. Hei 4-96212 (Patent Document 2). The variable-capacitance capacitor 12 has a coupling part to the core 11 as disclosed in the above-described Patent Document 2 and this coupling part is so configured as to slightly move together with the core 11 depending on the writing pressure applied to the core 11.

Numerals 13 and 14 denote electrodes and they are buried in the core 11. FIG. 2 is a sectional view when the core 11, in which the electrodes 13 and 14 are buried, is cut. Numeral 15 denotes a printed board. A terminal of the variable-capacitance capacitor 12 and the electrodes 13 and 14 are connected to the printed board 15 and circuit components to be described later are mounted on the printed board 15. In the following description, the electrode 13 will be referred to as the L electrode and the electrode 14 will be referred to as the R electrode.

FIG. 3 is a circuit configuration diagram of the position indicator of the first embodiment example according to the present invention. In FIG. 3, the same component as that in FIG. 1 is shown by the same numeral. That is, numeral 12 denotes the variable-capacitance capacitor and numerals 13 and 14 denote the L electrode and the R electrode, respectively. Transistors TR1 to TR3 configure an oscillation circuit that oscillates with a resonant frequency depending on a coil L1 and capacitors C1 and C2. A coil L2 is coupled to the coil L1 and boosts an AC voltage generated in the coil L1 to supply a signal of a high voltage to the L electrode 13 and the R electrode 14. Numeral 16 denotes an analog switch for supplying a signal (d) generated in the coil L2 to only either one of the L electrode 13 and the R electrode 14.

Numeral 17 denotes a microprocessor that operates based on a predetermined program and numeral 18 denotes a battery. An output signal (b) from a terminal P1 of the microprocessor 17 controls the above-described oscillation circuit to the on- or off-state via a transistor TR4. An output signal (a) from a terminal P2 is supplied to the analog switch 16. In the present embodiment example, the L electrode 13 is selected when the output signal (a) from the terminal P2 is at the low level and the R electrode 14 is selected when it is at the high level.

As described later, the microprocessor 17 sets a terminal P3 to the high level output state or the input state based on the predetermined program to thereby charge/discharge the variable-capacitance capacitor 12 and obtain the value of the writing pressure applied to the core 11.

Numeral 19 denotes a DC/DC converter that boosts the voltage of the battery 18 to generate a power source of a high voltage VP. The voltage VP is used as a power source to make the analog switch 16 operate and needs to be a voltage with amplitude higher than that of the signal d generated in the coil L2. A capacitor C3 is to add an offset voltage so that the signal (d) generated in the coil L2 may swing in the range of zero to VP.

FIG. 4 is a diagram showing the operation of the position indicator of the first embodiment example configured in this manner and shows how the signals a, b, c, and d in FIG. 3 change. The microprocessor 17 carries out control to keep the terminal P1 (signal b) at the high level for a certain period with the terminal P2 (signal a) set to the low level. Thereby, the signal (d) is radiated from the L electrode 13 for the certain period continuously (continuous transmission period: L, in FIG. 4). In this continuous transmission period, the microprocessor 17 controls the terminal P3 to obtain the writing pressure applied to the variable-capacitance capacitor 12. Specifically, the microprocessor 17 sets the terminal P3 to the high level output state to charge the variable-capacitance capacitor 12.

Next, the terminal P3 is switched to the input state. At this time, the charge accumulated in the variable-capacitance capacitor 12 is discharged by a resistor connected in parallel to it. Thus, the voltage (c) of the variable-capacitance capacitor 12 gradually decreases. A time Tp from the switch of the terminal P3 to the input state until the voltage c is dropped to a threshold is obtained. This time Tp is equivalent to the writing pressure to be obtained and the writing pressure is obtained as a 10-bit value in the present embodiment example.

Upon ending this continuous transmission period (L), the microprocessor 17 controls the terminal P1 to the high or low level with a predetermined cycle (Td) to thereby perform amplitude-shift keying (ASK) modulation. At this time, the terminal P1 is invariably set to the high level as the first round of the control (start signal: L, in FIG. 4). This is to allow the tablet side to accurately determine the subsequent data transmission timing.

In the period of Td following this start signal (L), the terminal P1 is set to the low level in this operation (sign: L, in FIG. 4). This is for distinction from the case in which the terminal P2 (signal a) is set to the high level as described later.

Subsequently to the sign (L), the 10-bit writing pressure data obtained by the above-described operation is sequentially transmitted. Specifically, the terminal P1 is controlled to the low level when the transmission data is 0 and the terminal P1 is controlled to the high level when the transmission data is 1 (writing pressure data transmission period: L, in FIG. 4). FIG. 4 shows the case in which the writing pressure to be transmitted is "0101110101."

Upon ending the transmission of the 10-bit writing pressure data, the microprocessor 17 sets the terminal P2 (signal a) to the high level to switch the analog switch 16 to the R side. This provides the state in which a signal is transmitted from the R electrode 14. Also at this time, the terminals P1 and P3 are controlled exactly as with the above-described case of transmission by the L electrode to sequentially execute processing of continuous transmission (R), start signal (R), sign (R), and writing pressure data transmission (R). At the time of the sign (R), the terminal P1 is set to the high level.

In the position indicator of the present embodiment example, transmission is performed with alternate switching between a first pattern in which only the L electrode is selected and a second pattern in which only the R electrode is selected. Furthermore, the "sign" information following the start signal is set to "0" when the selection is made in the first pattern and the "sign" information following the start signal is set to "1" when the selection is made in the second pattern. Such operation is to identify, on the tablet side, whether the immediately previous continuous transmission is from the L electrode or from the R electrode, and is one of features of the present invention.

FIG. 5 shows a configuration diagram of the tablet in the present embodiment example. The present embodiment example shows, as the tablet, a configuration that obtains indicated position and rotation angle of a position indicator 20 configured as described above and is capable also of detecting a touch position by a finger fg.

In FIG. 5, numeral 20 denotes the position indicator shown in FIGS. 1 to 3 and the frequency of a signal transmitted from the position indicator 20 is defined as f1. Numeral 21 denotes a tablet sensor whose base material is transparent glass. An X electrode group arranged in the X direction is provided on the front surface of the tablet sensor 21 and a Y electrode group arranged in the Y direction is provided on the back surface. These X electrode group and Y electrode group are formed as transparent electrodes by indium tin oxide (ITO). The tablet sensor 21 is disposed on a display device (not shown) and an input can be made directly to its display place by the position indicator 20, the finger fg of the user, etc.

Numeral 22 denotes an X selection circuit that selects one electrode from the X electrode group and numeral 23 denotes a Y selection circuit that selects one electrode from the Y electrode group. The present embodiment example will be explained based on the assumption that the number of X electrodes is 40 (X1 to X40) and the number of Y electrodes is 30 (Y1 to Y30).

Numeral 24 denotes an oscillator for supplying a drive signal to the Y electrodes when the present embodiment example is operated for touch detection and the oscillation frequency is defined as f2. Numeral 25 denotes a switch circuit that switches the connection target of the Y electrode selected by the Y selection circuit 23 to the oscillator 24 or the side of an amplification circuit to be described later. Numeral 26 denotes a control circuit to control the respective parts in the tablet of the present embodiment example. Specifically, when this device is operated for touch detection, a control signal e from the control circuit 26 to the switch circuit 25 is set to the high level "1" to select the side of the oscillator 24. When this device detects the position indicator 20, the control signal e is set to the low level "0" to select the amplification circuit side.

Numeral 27 denotes a switch circuit. It selects the X electrode selected by the X selection circuit 22 or selects the Y electrode selected by the Y selection circuit 23 via the switch circuit 25 to connect it to an amplification circuit 28. Specifically, when this device is operated for touch detection, a control signal f from the control circuit 26 to the switch circuit 27 is set to the low level "0" to select the side of the X selection circuit 22. When this device is operated to detect the position indicator 20 and the X-axis coordinate of the position indicator 20 is to be obtained, the control signal f is set to the low level "0" to select the side of the X selection circuit 22. When this device is operated to detect the position indicator 20 and the Y-axis coordinate of the position indicator 20 is to be obtained, the control signal f is set to the high level "1" to select the side of the Y selection circuit 23.

In FIG. 5, numeral 28 denotes the amplification circuit and numeral 29 denotes a gain control circuit. The output of the amplification circuit 28 is connected to the gain control circuit 29 and is so set as to become an output signal at a proper level by a control signal g from the control circuit 26.

Numeral 30 denotes a band-pass filter circuit having a predetermined band width centered at the frequency f1 or the frequency f2. This center frequency is switched by a control signal h from the control circuit 26. The frequency is switched to f1 when this device carries out operation of detecting the position indicator 20, and is switched to f2 when touch detection operation is carried out.

In FIG. 5, numeral 31 denotes a detection circuit and numeral 32 denotes an analog/digital (AD) converter. Numeral 33 denotes a microprocessor. An output signal of the band-pass filter circuit 30 is detected by the detection circuit 31 and is converted to a digital value by the AD conversion circuit 32 based on a control signal j from the control circuit 26. This digital data k is read and processed by the microprocessor 33.

The control circuit 26 supplies a control signal m and a control signal n to the X selection circuit 22 and the Y selection circuit 23, respectively, to select one electrode from each of the X electrode group and the Y electrode group.

The microprocessor 33 includes ROM and RAM inside and operates by a program stored in the ROM. The microprocessor 33 outputs a control signal p to control the control circuit 26 so that the control circuit 26 may output the control signals e to j, m, and n at predetermined timing.

Operation when the tablet of the present embodiment example configured in this manner performs touch detection will be briefly described. As described above, in the touch detection, the switch circuit 25 is connected to the side of the oscillation circuit 24 to supply the drive signal to the Y electrode selected by the Y selection circuit 23. Furthermore, the X electrode selected by the X selection circuit 22 is connected to the amplification circuit 28 via the switch circuit 27 and the signal level from the amplification circuit 28 is converted to a digital value by the AD conversion circuit 32 via the gain control circuit 29, the band-pass filter circuit 30, and the detection circuit 31.

At this time, if a finger is made to touch the intersection of the respective electrodes selected by the X selection circuit 22 and the Y selection circuit 23, the detected signal level is lower than the level when a finger is absent. Therefore, if the signal level when a finger is absent is obtained in advance for all intersections of the X electrodes and the Y electrodes, the touch position can be obtained from the position at which the signal level is lowered.

Operation when the tablet of the present embodiment example detects indicated position and rotation angle of the position indicator 20 will be described below. The microprocessor 33 outputs the control signal p to the control circuit 26 so that the control signal e may be set to the low level "0" to select the amplification circuit side in the switch circuit 25 and the control signal f may be set to the low level "0" to select the X electrode side in the switch circuit 27. In this state, only the X electrode selected by the X selection circuit 22 is connected to the amplification circuit 28 and the Y electrode is connected to neither the amplification circuit 28 nor the oscillation circuit 24.

FIG. 6 shows X-axis whole surface scan operation for obtaining the rough X-direction position of the position indicator 20 on the tablet sensor 21. The microprocessor 33 makes the control circuit 26 output the control signal m that causes the X selection circuit 22 to select the electrode X1, and reads the signal level (k) at this time. The microprocessor 33 reads the signal level (k) while making the control circuit 26 sequentially switch the electrode selected by the X selection circuit 22 to the electrodes X2, X3, X4 . . . .

At this time, if the detected signal level does not reach a predetermined value with all electrodes X1 to X40, the microprocessor 33 determines that the position indicator 20 is not present on the tablet sensor 21 and repeats the operation of FIG. 6. If a signal at a level equal to or higher than the predetermined value is detected from any of the electrodes X1 to X40, the microprocessor 33 stores the number of the X electrode from which the highest signal level is detected (in FIG. 6, X11).

Upon getting to know that the position indicator 20 is present near the electrode X11, the microprocessor 33 carries out transition operation to partial scan. FIG. 7 is a diagram for explaining the transition operation to the partial scan in the tablet. This transition operation to the partial scan is operation for the microprocessor 33 to synchronize the timing with the operation of the position indicator 20 by detecting the start time of the continuous transmission period of the position indicator 20 when the position indicator 20 repeats operation like that shown in FIG. 4, and to obtain the rough position about the Y-axis.

In FIG. 7, the microprocessor 33 controls the control circuit 26 so that the X selection circuit 22 may select the electrode X11 obtained in the above-described X-axis whole surface scan operation. At this time, a signal corresponding to the signal transmitted from the position indicator 20 is induced in the electrode X11 and a voltage corresponding to its signal level is generated in the detection circuit 31. The microprocessor 33 makes the AD conversion circuit 32 operate with a constant cycle to read the signal level (k). This cycle of the operation of the AD conversion circuit 32 is set to a time sufficiently shorter than the cycle of transmission by the position indicator 20 in the writing pressure data transmission period.

When the signal level output by the AD conversion circuit 32 is equal to or higher than a predetermined value for a certain time (Ts) continuously, the microprocessor 33 determines that the continuous transmission period of the position indicator 20 has been started and transitions to Y-axis whole surface scan operation (FIG. 7). This time Ts is set to a time sufficiently longer than the cycle of transmission by the position indicator 20 in the writing pressure data transmission period.

The microprocessor 33 controls the control circuit 26 so that the control signal f may be set to the high level "1" to select the Y electrode side in the switch circuit 27. Furthermore, the Y selection circuit 23 sequentially selects the electrodes from Y1 to Y30 and the AD conversion circuit 32 is operated to read the signal level (k). At this time, the microprocessor 33 stores the electrode from which the highest signal level is detected. The explanation of the present embodiment example will be made based on the assumption that the highest signal level is detected from the electrode Y20.

After the Y selection circuit 23 selects the last electrode Y30 and detection of the signal level is ended, the microprocessor 33 carries out operation for waiting for the end of the continuous transmission period of the position indicator 20. The microprocessor 33 controls the control circuit 26 so that the control signal f may be set to the low level "0" to select the X electrode side in the switch circuit 27. Furthermore, the microprocessor 33 carries out control to make the X selection circuit 22 select the electrode X11. At this time, a signal at a level equal to or higher than the above-described predetermined value is detected if transmission from the position indicator 20 still continues. The time at which the received signal level comes short of the predetermined value is the end time of the continuous transmission from the position indicator 20. Subsequently, the position indicator 20 enters the writing pressure data transmission period. However, the detailed position of the position indicator 20 has not yet been obtained at this timing. Thus, the microprocessor 33 does not read writing pressure data and transitions to partial scan operation shown in FIGS. 8A-8B.

FIGS. 8A-8B are diagrams that together constitute a single diagram of FIG. 8 for explaining the partial scan operation in the tablet of the present embodiment example. When the signal level output by the AD conversion circuit 32 is equal to or higher than the predetermined value for the certain time (Ts) continuously while the electrode X11 is selected, the microprocessor 33 determines that the continuous transmission period of the position indicator 20 has been started and transitions to coordinate detection operation (step 1 in FIG. 8A). This time Ts is the same as that explained with FIG. 7 and is set to a time sufficiently longer than the cycle of transmission by the position indicator 20 in the writing pressure data transmission period.

In order to obtain the X coordinate of the signal from the position indicator 20, the microprocessor 33 makes the X selection circuit 22 sequentially select five electrodes centered at X11 (X9 to X13) with the control signal f kept at the low level "0," and makes the AD conversion circuit 32 operate to read the signal level (step 1). At this time, the number of the electrode from which the highest signal level is detected (X11, in this example) and this signal level (Vpx0) is stored. In addition, the levels detected with both electrodes adjacent to this electrode are stored as Vax0 and Vbx0 (step 1).

Next, in order to obtain the Y coordinate of the signal from the position indicator 20, the microprocessor 33 sets the control signal f to the high level "1." Furthermore, the microprocessor 33 makes the Y selection circuit 23 sequentially select five electrodes centered at Y20 (Y18 to Y22) and reads the signal level (step 1). At this time, the number of the electrode from which the highest signal level is detected (Y20, in this example) and this signal level (Vpy0) is stored. In addition, the levels detected with both electrodes adjacent to this electrode are stored as Vay0 and Vby0 (step 1). The obtained signal levels Vpx0, Vax0, Vbx0, Vpy0, Vay0, and Vby0 are used for calculation of coordinate values by a calculation equation to be described later.

Next, the microprocessor 33 carries out operation for waiting for the end of the continuous transmission period of the position indicator 20. The microprocessor 33 sets the control signal f to the low level "0" and carries out control to make the X selection circuit 22 select the electrode X11, from which the peak level is detected in the above-described coordinate detection operation. At this time, the time at which the received signal level comes short of the predetermined value is the end time of the continuous transmission from the position indicator 20 (step 1).

Upon detecting the end of the continuous transmission from the position indicator 20, the microprocessor 33 enters operation of detecting the timing of the start signal transmitted prior to writing pressure data (step 2). The microprocessor 33 carries out control to repeatedly activate the AD conversion circuit 32 with the electrode X11 selected, and stores the time at which the signal level becomes equal to or higher than the above-described predetermined value as t1. The microprocessor 33 starts operation of data reception from the position indicator 20 from the time after waiting for a certain time Tw from the time t1 (step 2). This time Tw is set to the time from the end of transmission of the start signal from the position indicator 20 to the timing at which the signal level received by the tablet becomes almost zero, and this time is obtained in advance.

The microprocessor 33 activates a timer (not shown) simultaneously with the timing at which the above-described waiting time reaches Tw. This timer repeatedly counts values from zero to the value corresponding with the above-described time Td (cycle of data transmission from the position indicator 20) (step 2). In the operation period of one cycle of the timer, the microprocessor 33 repeatedly activates the AD conversion circuit 32 and reads the signal level. If the signal level during this period never reaches the above-described predetermined value, the microprocessor 33 determines that transmission from the position indicator 20 is not made and stores the data of this round as "0." If a signal level equal to or higher than the predetermined value is detected in this period, the microprocessor 33 determines that transmission from the position indicator 20 is made and stores the data of this round as "1" (step 2).

The above-described timer count is performed eleven times and 11-bit data is stored. In this data, the data of the first round is equivalent to the "sign" shown in FIG. 4. Because this sign is 0 in step 2 in FIG. 8A, it turns out that the coordinates calculated from the signal levels Vpx0, Vax0, Vbx0, Vpy0, Vay0, and Vby0 obtained in step 1 are the coordinate position corresponding to the L electrode of the position indicator 20. The remaining 10-bit data represents the writing pressure value measured in the position indicator 20 in the period of step 1.

Although the electrode from which the maximum level is detected (X11) is selected from the X-axis electrodes and data is received in step 2, this step may be carried out by selecting the electrode from which the maximum level is detected (Y20) from the Y-axis electrodes.

Upon ending the reception of the 11-bit data in step 2, the microprocessor 33 transitions to operation of detecting the start of the continuous transmission period of the position indicator 20. The microprocessor 33 repeatedly detects the signal level received with the electrode X11 selected. When this reception level is equal to or higher than the predetermined value for the certain time (Ts) continuously, the microprocessor 33 determines that the continuous transmission period of the position indicator 20 has been started and transitions to coordinate detection operation (step 3 in FIG. 8B).

In order to obtain the X coordinate of the signal from the position indicator 20, the microprocessor 33 makes the X selection circuit 22 sequentially select five electrodes centered at X11 (X9 to X13) with the control signal f kept at the low level "0," and makes the AD conversion circuit 32 operate to read the signal level (step 3). At this time, the number of the electrode from which the highest signal level is detected (X11, in this example) and this signal level (Vpx1) is stored. In addition, the levels detected with both electrodes adjacent to this electrode are stored as Vax1 and Vbx1 (step 3).

Next, in order to obtain the Y coordinate of the signal from the position indicator 20, the microprocessor 33 sets the control signal f to the high level "1." Furthermore, the microprocessor 33 makes the Y selection circuit 23 sequentially select five electrodes centered at Y20 (Y18 to Y22) and reads the signal level (step 3). At this time, the number of the electrode from which the highest signal level is detected (Y20, in this example) and this signal level (Vpy1) is stored. In addition, the levels detected with both electrodes adjacent to this electrode are stored as Vay1 and Vby1 (step 3). The obtained signal levels Vpx1, Vax1, Vbx1, Vpy1, Vay1, and Vby1 are used for calculation of coordinate values by a calculation equation to be described later.

Next, the microprocessor 33 carries out operation for waiting for the end of the continuous transmission period of the position indicator 20. The microprocessor 33 sets the control signal f to the low level "0" and carries out control to make the X selection circuit 22 select the electrode X11, from which the peak level is detected in the above-described coordinate detection operation. At this time, the time at which the received signal level comes short of the predetermined value is the end time of the continuous transmission from the position indicator 20 (step 3).

Upon detecting the end of the continuous transmission from the position indicator 20, the microprocessor 33 enters operation of detecting the timing of the start signal transmitted prior to writing pressure data (step 4). The microprocessor 33 carries out control to repeatedly activate the AD conversion circuit 32 with the electrode X11 selected, and stores the time at which the signal level becomes equal to or higher than the above-described predetermined value as t2. The microprocessor 33 starts operation of data reception from the position indicator 20 from the time after waiting for the certain time Tw from the time t2 (step 4). This Tw is set to the same time as that in step 2.

The microprocessor 33 activates the timer simultaneously with the timing at which the above-described waiting time reaches Tw and receives 11-bit data from the position indicator 20 exactly as with the above-described step 2 (step 4). The data of the first round is equivalent to the "sign" shown in FIG. 4. Because this sign is 1 in step 4 in FIG. 8B, it turns out that the coordinates calculated from the signal levels Vpx1, Vax1, Vbx1, Vpy1, Vay1, and Vby1 obtained in step 3 are the coordinate position corresponding to the R electrode of the position indicator 20. The remaining 10-bit data represents the writing pressure value measured in the position indicator 20 in the period of step 3. In this manner, identification as to which electrode of the position indicator 20 the transmission is made from is allowed by the specific data value from the position indicator 20. This is one of features of the present invention.

Although the electrode from which the maximum level is detected (X11) is selected from the X-axis electrodes and data is received also in step 4, this step may be carried out by selecting the electrode from which the maximum level is detected (Y20) from the Y-axis electrodes.

In the present embodiment example, the transmission from the position indicator 20 by the L electrode and the transmission by the R electrode are alternately repeated. Therefore, by repeatedly carrying out step 1 to step 4 in FIG. 8B as the operation of the tablet side, the coordinates, rotation angle, and writing pressure of the position indicator 20 can be continuously obtained.

The method for obtaining the coordinate position and rotation angle of the position indicator 20 from the reception levels obtained in the above-described step 1 and step 3 will be described below.

Coordinate values (X0, Y0) by the L electrode of the position indicator 20 are calculated from the reception levels Vpx0, Vax0, Vbx0, Vpy0, Vay0, and Vby0 obtained in step 1 by the following equation (1) and equation (2), respectively.

$$X0 = Px0 + \frac{Dx}{2} \times \frac{Vbx0 - Vax0}{2 \times Vpx0 - Vax0 - Vbx0} \quad (1)$$

In this equation, Px0 is the coordinate position of the electrode from which the maximum level is detected regarding the X axis (X11, in this example) and Dx is the arrangement pitch between the X-axis electrodes.

$$Y0 = Py0 + \frac{Dy}{2} \times \frac{Vby0 - Vay0}{2 \times Vpy0 - Vay0 - Vby0} \quad (2)$$

In this equation, Py0 is the coordinate position of the electrode from which the maximum level is detected regarding the Y axis (Y20, in this example) and Dy is the arrangement pitch between the Y-axis electrodes.

Similarly, coordinate values (X1, Y1) by the R electrode of the position indicator 20 are calculated from the reception levels Vpx1, Vax1, Vbx1, Vpy1, Vay1, and Vby1 obtained in step 3 by the following equation (3) and equation (4), respectively.

$$X1 = Px1 + \frac{Dx}{2} \times \frac{Vbx1 - Vax1}{2 \times Vpx1 - Vax1 - Vbx1} \quad (3)$$

In this equation, Px1 is the coordinate position of the electrode from which the maximum level is detected regarding the X axis (X11, in this example) and Dx is the arrangement pitch between the X-axis electrodes.

$$Y1 = Py1 + \frac{Dy}{2} \times \frac{Vby1 - Vay1}{2 \times Vpy1 - Vay1 - Vby1} \quad (4)$$

In this equation, Py1 is the coordinate position of the electrode from which the maximum level is detected regarding the Y axis (Y20, in this example) and Dy is the arrangement pitch between the Y-axis electrodes.

FIG. 9 is a principle diagram for calculating a rotation angle θ of the position indicator 20 about the axis defined as the perpendicular direction to the tablet surface, based on two pairs of coordinate values (X0, Y0) and (X1, Y1). In this diagram, the orientation of the R electrode corresponding to the coordinate values (X1, Y1) is defined by employing the positive direction of the Y axis as the basis (θ=0) and defining the range of θ as −180°<θ≤+180°. In this case, the rotation angle θ of the position indicator 20 is calculated from X0, Y0, X1, and Y1 as shown by the following equations (5) to (9).

When Y1>Y0

$$\theta = \tan^{-1}\left(\frac{X1 - X0}{Y1 - Y0}\right) \quad (5)$$

When Y1=Y0 and X1>X0

θ=90° (6)

When Y1=Y0 and X1<X0

θ=−90° (7)

When Y1<Y0 and X1≥X0

$$\theta = 180° + \tan^{-1}\left(\frac{X1 - X0}{Y1 - Y0}\right) \quad (8)$$

When Y1<Y0 and X1<X0

$$\theta = -180° + \tan^{-1}\left(\frac{X1 - X0}{Y1 - Y0}\right) \quad (9)$$

In the present embodiment example, the Y-axis positive direction is defined as the basis of the rotation angle and the orientation of the R electrode (relative to the basis) is obtained as an angle. However, the X axis may be defined as the basis and the orientation of the L electrode may be obtained.

In the present embodiment example, the same information (writing pressure) is sent both in data transmission by the L electrode and in data transmission by the R electrode of the position indicator 20. However, another kind of information may be sent in one of them or only sign information may be sent as one of the data to shorten the time. Furthermore, only one of the L electrode and the R electrode may be used for data transmission and the tablet may determine the electrode, with which the immediately previous continuous transmission is performed, based on whether data transmission from the position indicator 20 has been made. Moreover, the frequency of transmission may be changed between transmission from the L electrode and transmission from the R electrode to differentiate them or the length of the continuous transmission may be changed for differentiation.

In the present embodiment example, the electrodes of the position indicator 20 are exposed to the tip part of the core 11. However, they may be covered by the material of the core 11, such as plastic.

Second Embodiment Example

FIG. 10 is a diagram showing the structure of a position indicating part in a position indicator of a second embodiment example according to the present invention. In FIG. 10, the same part as that in FIG. 1 is given the same reference numeral. That is, numeral 12 denotes a variable-capacitance capacitor whose capacitance changes depending on the writing pressure and numeral 15 denotes a printed board. A core 35 is coupled to the variable-capacitance capacitor 12 and the writing pressure applied to the tip of the core 35 is detected. Numeral 36 denotes a chassis and a hole through which the core 35 passes is made at its tip part.

Two electrodes 37 and 38 are provided at the tip part of the chassis 36 and FIG. 11 is a diagram showing the arrangement thereof. The following description will be so made that the electrodes 37 and 38 are called the L electrode and the R electrode, respectively.

FIG. 12 is a circuit configuration diagram of the position indicator of the second embodiment example according to the present invention. In FIG. 12, the same part as that in FIG. 3 or FIG. 10 is given the same reference numeral. That is, numeral 12 denotes the variable-capacitance capacitor. Numerals 37 and 38 denote the L electrode and the R electrode, respectively. Numerals 17, 18, and 19 denote a microprocessor, a battery, and a DC/DC converter, respectively.

The difference between the configuration of the position indicator of the second embodiment example shown in FIG. 12 and the configuration of the position indicator 20 of the first embodiment example shown in FIG. 3 is as follows. In the first embodiment example, one of two electrodes is connected to the coil L2 with alternate switching. In contrast, in the present embodiment example, the electrode 37 (L electrode) is always connected to the coil L2 and an analog switch 39 is provided between the electrode 38 (R electrode) and the coil L2 and is controlled to the on- or off-state.

Specifically, when the terminal P2 (signal a) of the microprocessor 17 is set to the high level, the analog switch 39 becomes the on-state and thus the signal (d) generated in the coil L2 is applied to both the L electrode and the R electrode. When the terminal P2 (signal a) of the microprocessor 17 is set to the low level, the analog switch 39 becomes the off-state and thus the signal (d) generated in the coil L2 is applied to only the L electrode.

The voltage VP obtained by the DC/DC converter 19 is used as a power supply to operate the analog switch 39 similarly to the first embodiment example.

FIG. 13 is a diagram showing the operation of the position indicator of the second embodiment example and shows how the signals a, b, c, and d in FIG. 12 change. The microprocessor 17 carries out control to keep the terminal P1 (signal b) at the high level for a certain period with the terminal P2 (signal a) set to the high level. Thereby, the signal (d) is radiated from the L electrode and the R electrode for the certain period continuously (continuous transmission period: L+R, in FIG. 13). In this continuous transmission period, the microprocessor 17 obtains the writing pressure applied to the variable-capacitance capacitor 12 similarly to the first embodiment example.

Upon ending this continuous transmission period, the microprocessor 17 performs ASK modulation by controlling the terminal P1 with the cycle Td exactly as with the first embodiment example. A sign (L+R) following the start signal at this time is set to "0" indicating that the immediately previous continuous transmission is made by two electrodes. Subsequently to this sign transmission, 10-bit writing pressure data obtained in the above-described continuous transmission period is transmitted similarly to the first embodiment example.

Upon ending the transmission of the writing pressure data, the microprocessor 17 sets the terminal P2 (signal a) to the low level to turn off the analog switch 39. This provides the state in which a signal is transmitted from only the L electrode 37. Also at this time, the terminal P1 is similarly controlled to perform continuous transmission (L) and writing pressure detection is performed.

Upon ending this continuous transmission period, the microprocessor 17 sets the terminal P2 (signal a) to the high level so that the subsequent data transmission may be made by two electrodes. The purpose thereof is to allow the tablet to surely detect data of the writing pressure and so forth by transmitting the data by two electrodes. The microprocessor 17 performs ASK modulation by controlling the terminal P1 with the cycle Td similarly to the above description. A sign (L) following the start signal at this time is set to "1" indicating that the immediately previous continuous transmission is made by only the L electrode. Subsequently to this sign transmission, 10-bit writing pressure data obtained in the above-described continuous transmission period is sequentially transmitted.

In the position indicator of the present embodiment example, transmission is performed with alternate switching between a first pattern in which both the L electrode and the R electrode are selected and a second pattern in which only the L electrode is selected. Furthermore, the "sign" information following the start signal is set to "0" when the selection is made in the first pattern and the "sign" information following the start signal is set to "1" when the selection is made in the second pattern. Such operation is to identify, on the tablet side, whether the immediately previous continuous transmission is from two electrodes or from only the L electrode, and is one of features of the present invention.

Also in the present embodiment example, the tablet having the same configuration as that of the first embodiment example (FIG. 5) is used. Operation of detecting indicated position and rotation angle when the position indicator of the present embodiment example is placed on the tablet of FIG. 5 will be described below.

Also in the present embodiment example, operation for obtaining the rough position of the position indicator is carried out as shown in FIGS. 6 and 7 similarly to the first embodiment example. In FIG. 7, the Y-axis whole surface scan operation after detection of continuous transmission from the position indicator may be carried out in the continuous transmission period in which transmission from the position indicator is made by two electrodes or may be carried out in the continuous transmission period in which transmission is made by only the L electrode. The explanation of the present embodiment example will also be made based on the assumption that the signal of the maximum level is detected from the electrode X11 in the X-axis whole surface scan operation in FIG. 6 and the signal of the maximum level is detected from the electrode Y20 in the Y-axis whole surface scan operation in FIG. 7.

FIGS. 14A-14B are diagrams that together constitute a single diagram of FIG. 14, which shows partial scan operation of the second embodiment example. The difference of the partial scan operation according to the present embodiment example from the partial scan operation of the first embodiment example (FIGS. 8A-8B) is as follows. In the present embodiment example, the coordinates obtained by coordinate detection operation (step 1 in FIG. 14A) immediately before the "sign" data from the position indicator is transmitted as "0" indicate the midpoint position between the L electrode and the R electrode (i.e., the position of the core 35). Furthermore, the coordinates obtained by coordinate detection operation (step 3 in FIG. 14B) immediately before the "sign" data from the position indicator is transmitted as "1" indicate the position corresponding to the L electrode. The other operation is the same as that in the first embodiment example.

Also in the present embodiment example, coordinate values indicating the midpoint position between the L electrode and the R electrode of the position indicator are calculated as (X0, Y0) from the reception levels Vpx0, Vax0, Vbx0, Vpy0, Vay0, and Vby0 obtained in step 1 by using the above-described equation (1) and equation (2).

Furthermore, coordinate values corresponding to the position of the L electrode of the position indicator are calculated as (X1, Y1) from the reception levels Vpx1, Vax1, Vbx1, Vpy1, Vay1, and Vby1 obtained in step 3 by using the above-described equation (3) and equation (4).

The principle diagram of FIG. 9 is applied also to the present embodiment example, so that the orientation of the L electrode corresponding to the coordinate values (X1, Y1) is defined by employing the positive direction of the Y axis as the basis ($\theta=0$) and defining the range of $\theta$ as $-180° < \theta \leq +180°$. In this case, the rotation angle $\theta$ of the position indicator is calculated by the above-described equations (5) to (9) with use of X0, Y0, X1, and Y1 in exactly the same way.

In the present embodiment example, the same information (writing pressure) is sent both in data transmission by two electrodes of the position indicator and in data transmission by only the L electrode. However, another kind of information may be sent in one of them or only sign information may be sent as one of the data to shorten the time. Furthermore, data transmission may be performed only at the time of the transmission by two electrodes and the tablet may make the determination depending on whether data transmission from the position indicator has been made. Alternatively, the length of the continuous transmission may be changed to differentiate the transmission.

Although the electrodes of the position indicator are provided at the tip part of the chassis 36 in the present embodiment example, they may be provided on the core 35 similarly to the first embodiment example.

Third Embodiment Example

FIG. 15 is a diagram showing the structure of a position indicating part in a position indicator of a third embodiment example according to the present invention. In the present embodiment example, an example is shown in which three electrodes are disposed in the position indicator and a tilt of the position indicator relative to the tablet is obtained in addition to a rotation angle thereof.

In FIG. 15, the same part as that in FIG. 10 is given the same reference numeral. That is, numeral 12 denotes a variable-capacitance capacitor whose capacitance changes depending on the writing pressure. Numerals 15, 35, and 36 denote a printed board, a core, and a chassis, respectively. Three electrodes 40, 41, and 42 are provided at the tip part of the chassis 36 and FIG. 16 is a diagram showing the arrangement thereof. These three electrodes are connected to the printed board 15 by a connection line (not shown).

FIG. 17 is a circuit configuration diagram of the position indicator of the third embodiment example according to the present invention. In FIG. 17, the same part as that in FIG. 15 or FIG. 3 is given the same reference numeral. That is, numeral 12 denotes the variable-capacitance capacitor. Numerals 40 to 42 denote the electrodes. Numerals 17, 18, and 19 denote a microprocessor, a battery, and a DC/DC converter, respectively.

The difference of the configuration shown in FIG. 17 from the first embodiment example (FIG. 3) is as follows. In the first embodiment example, one of two electrodes is connected to the coil L2 with alternate switching. In contrast, in the present embodiment example, one of three electrodes 40 to 42 is connected to the coil L2 with sequential switching. An analog multiplexer 43 is provided between the electrodes 40 to 42 and the coil L2 and one is selected among the electrode 40, the electrode 41, and the electrode 42 by setting of two terminals of the microprocessor 17 (P2 and P4). Signals from two terminals of the microprocessor 17 (P2 and P4) are referred to collectively as the "signal a" here.

The voltage VP obtained by the DC/DC converter 19 is used as a power supply to operate the analog multiplexer 43 similarly to the first embodiment example.

FIG. 18 is a diagram showing the operation of the position indicator of the third embodiment example and shows how the signals a, b, c, and d in FIG. 17 change. The microprocessor 17 carries out control to keep the terminal P1 (signal b) at the high level for a certain period with the electrode 40 selected by the setting by the signal a. Thereby, the signal (d) is radiated from the electrode 40 for the certain period continuously (continuous transmission period 1, in FIG. 18). In this continuous transmission period, the microprocessor 17 obtains the writing pressure applied to the variable-capacitance capacitor 12 similarly to the first embodiment example.

Upon ending this continuous transmission period, the microprocessor 17 performs ASK modulation by controlling the terminal P1 with the cycle Td exactly as with the first embodiment example. The "sign" following the "start signal" at this time is set to "0" indicating that the immediately previous continuous transmission is made by the electrode 40. Subsequently to this sign transmission, 10-bit writing pressure data obtained in the above-described continuous transmission period 1 is transmitted similarly to the first embodiment example.

Upon ending the transmission of the writing pressure data, the microprocessor 17 switches the setting by the signal a to select the electrode 41, and similarly controls the terminal P1 to perform continuous transmission (continuous transmission period 2, in FIG. 18). At this time, writing pressure detection like that performed in continuous transmission period 1 is not performed in the present embodiment example.

Upon the end of this continuous transmission period 2, the microprocessor 17 performs ASK modulation by controlling the terminal P1 with the cycle Td while keeping of the selection of the electrode 41 by the setting by the signal a. The "sign" following the start signal at this time is transmitted as "1."

Upon ending this sign transmission, the microprocessor 17 switches the setting by the signal a to select the electrode 42, and similarly controls the terminal P1 to perform continuous transmission (continuous transmission period 3, in FIG. 18). Also at this time, writing pressure detection like that performed in continuous transmission period 1 is not performed.

Upon the end of this continuous transmission period, the microprocessor 17 performs ASK modulation by controlling the terminal P1 with the cycle Td while keeping of the selection of the electrode 42 by the setting by the signal a. Also at this time, the "sign" following the start signal is transmitted as "1."

In the position indicator of the present embodiment example, the following patterns are set: a first pattern in which only the electrode 40 is selected, a second pattern in which only the electrode 41 is selected, and a third pattern in which only the electrode 42 is selected. Transmission is performed with sequential repetition of the patterns, i.e., like in the second pattern subsequently to the first pattern, in the third pattern subsequently to the second pattern, and in the first pattern subsequently to the third pattern. Furthermore, the "sign" information following the start signal is set to "0" when the selection is made in the first pattern and the "sign" information following the start signal is set to "1" when the selection is made in the second pattern and the third pattern. Therefore, the tablet side can identify which electrode of the position indicator a signal is transmitted from by considering the above-described transmission order. These operations are one of features of the present invention.

Also in the present embodiment example, the tablet having the same configuration as that of the first embodiment example (FIG. 5) is used. Operation of detecting indicated position, rotation angle, and tilt relative to the tablet surface when the position indicator of the present embodiment example is placed on the tablet of FIG. 5 will be described below.

Also in the present embodiment example, operation for obtaining the rough position of the position indicator is carried out as shown in FIGS. 6 and 7 similarly to the first embodiment example. In FIG. 7, any electrode may be used for transmission from the position indicator in the continuous transmission period in which the Y-axis whole surface scan operation after detection of continuous transmission from the position indicator is carried out. The explanation of the present embodiment example will also be made based on the assumption that the signal of the maximum level is detected from the electrode X11 in the X-axis whole surface scan operation in FIG. 6 and the signal of the maximum level is detected from the electrode Y20 in the Y-axis whole surface scan operation in FIG. 7.

FIGS. 19A-19B are diagrams that together constitute a single diagram of FIG. 19, which shows partial scan operation of the third embodiment example. Also in the present embodiment example, after a signal continuing for the certain time (Ts) or longer from the position indicator is detected, coordinate detection operation of the X axis and the Y axis is carried out. Then, data sent subsequently to continuous transmission from the position indicator is received. This data is transmitted subsequently to the "start signal" also as shown in FIG. 18. In the present embodiment example, if "0" is received as the "sign" following immediately after the "start signal," the data reception operation is continuously carried out to receive 10-bit writing pressure data. If "1" is received as the "sign," the data reception operation is ended and transition to operation for detecting continuous transmission from the position indicator is made.

In FIG. 19A, "0" is received as the sign in step 2. Thus, in the immediately previous coordinate detection operation (step 1), the level and coordinate position based on a signal transmitted from the electrode 40 of the position indicator are obtained. In the subsequent coordinate detection operation (step 3), the level and coordinate position based on a signal transmitted from the electrode 41 of the position indicator are obtained. In the further subsequent coordinate detection operation (step 5), the level and coordinate position based on a signal transmitted from the electrode 42 of the position indicator are obtained.

In the present embodiment example, in order to obtain the tilt of the position indicator by using the reception levels obtained in the respective coordinate detection operations of step 1, step 3, and step 5, the gain value set in the gain control circuit 29 of the tablet circuit (FIG. 5) is set identical in these respective coordinate detection operations.

Coordinate values (X1, Y1) by the electrode 40 of the position indicator are calculated from the reception levels Vpx1, Vax1, Vbx1, Vpy1, Vay1, and Vby1 obtained in step 1 by the above-described equation (3) and equation (4).

Furthermore, coordinate values (X2, Y2) by the electrode 41 of the position indicator are obtained from reception levels Vpx2, Vax2, Vbx2, Vpy2, Vay2, and Vby2 obtained in step 3 by the following equation (10) and equation (11).

$$X2 = Px2 + \frac{Dx}{2} \times \frac{Vbx2 - Vax2}{2 \times Vpx2 - Vax2 - Vbx2} \quad (10)$$

In this equation, Px2 is the coordinate position of the electrode from which the maximum level is detected regarding the X axis (X11, in this example) and Dx is the arrangement pitch between the X-axis electrodes.

$$Y2 = Py2 + \frac{Dy}{2} \times \frac{Vby2 - Vay2}{2 \times Vpy2 - Vay2 - Vby2} \quad (11)$$

In this equation, Py2 is the coordinate position of the electrode from which the maximum level is detected regarding the Y axis (Y20, in this example) and Dy is the arrangement pitch between the Y-axis electrodes.

Coordinate values (X3, Y3) by the electrode 42 of the position indicator are obtained from reception levels Vpx3, Vax3, Vbx3, Vpy3, Vay3, and Vby3 obtained in step 5 by the following equation (12) and equation (13).

$$X3 = Px3 + \frac{Dx}{2} \times \frac{Vbx3 - Vax3}{2 \times Vpx3 - Vax3 - Vbx3} \quad (12)$$

In this equation, Px3 is the coordinate position of the electrode from which the maximum level is detected regarding the X axis (X11, in this example) and Dx is the arrangement pitch between the X-axis electrodes.

$$Y3 = Py3 + \frac{Dy}{2} \times \frac{Vby3 - Vay3}{2 \times Vpy3 - Vay3 - Vby3} \quad (13)$$

In this equation, Py3 is the coordinate position of the electrode from which the maximum level is detected regarding the Y axis (Y20, in this example) and Dy is the arrangement pitch between the Y-axis electrodes.

Coordinate values (X0, Y0) corresponding to the core 35 of the position indicator can be obtained as the center point of three obtained coordinate values (X1, Y1), (X2, Y2), and (X3, Y3) by the following equation (14) and equation (15).

$$X0 = \frac{X1 + X2 + X3}{3} \quad (14)$$

$$Y0 = \frac{Y1 + Y2 + Y3}{3} \quad (15)$$

The principle diagram of FIG. 9 is applied also to the present embodiment example, so that the orientation of the electrode 40 corresponding to the coordinate values (X1, Y1) is defined by employing the positive direction of the Y axis as the basis (θ=0) and defining the range of θ as −180°<θ≤+180°. In this case, the rotation angle θ of the position indicator is calculated by the above-described equations (5) to (9) with use of X0, Y0, X1, and Y1 in exactly the same way.

In the present embodiment example, a tilt of the position indicator can be obtained from the respective received signal intensities from three electrodes of the position indicator. As the received signal intensity, the level at the time of the X-axis coordinate detection may be used or the level at the time of the Y-axis coordinate detection may be used. Here, the level at the time of the X-axis coordinate detection is used.

Received signal intensity (V1) by the electrode 40 is obtained by correction calculation by the following equation (16) based on the X electrode positions of the tablet.

$$V1 = Vpx1 + \frac{(Vax1 - Vbx1)^2}{8 \times (2 \cdot Vpx1 - Vax1 - Vbx1)} \quad (16)$$

Received signal intensity (V2) by the electrode 41 is obtained by the following equation (17).

$$V2 = Vpx2 + \frac{(Vax2 - Vbx2)^2}{8 \times (2 \cdot Vpx2 - Vax2 - Vbx2)} \quad (17)$$

Received signal intensity (V3) by the electrode 42 is obtained by the following equation (18).

$$V3 = Vpx3 + \frac{(Vax3 - Vbx3)^2}{8 \times (2 \cdot Vpx3 - Vax3 - Vbx3)} \quad (18)$$

FIG. 20 is a principle diagram for obtaining the tilt of the position indicator by using the received signal intensities V1, V2, and V3 from three electrodes. In FIG. 20, the height direction from the sensor surface (21 in FIG. 5) of the tablet is employed as the z axis and the coordinate axes are so set that the center G of an equilateral triangle configured by A, B, and C corresponding to the tips of the electrodes 40, 41, and 42, respectively, of the position indicator exists on the yz plane and point A corresponding to the tip of the electrode 40 exists on the z axis. When the coordinates of the respective points at this time are represented as point A (0, 0, z1), point B (x2, y2, z2), point C (x3, y3, z3), and point G (0, yg, zg), the tilt (θx, θy) of the position indicator is obtained as shown by the following equation (19) and equation (20).

$$\sin \theta x = \frac{z2 - z3}{r} \quad (19)$$

(r: the length of one side of the equilateral triangle)

$$\sin \theta y = \frac{2 \cdot z1 - z2 - z3}{r\sqrt{3}} \quad (20)$$

(slope of the segment coupling point A and the midpoint between B and C)

The distances (z1, z2, z3) of point A, point B, and point C, which are the tip positions of three electrodes of the position indicator, from the tablet sensor surface are almost inversely proportional to the received signal intensities V1, V2, and V3. Therefore, the relationships are represented as the following equation (21) and equation (22) with use of α as a proportionality coefficient.

$$z1 = \alpha/V1, z2 = \alpha/V2, z3 = \alpha/V3$$

therefore, θx and θy are represented as follows $$\theta x = \sin^{-1} \frac{\alpha(V3 - V2)}{r \cdot V2 \cdot V3} \quad (21)$$

$$\theta y = \sin^{-1} \frac{\alpha(2 \cdot V2 \cdot V3 - V1 \cdot V3 - V1 \cdot V2)}{r \cdot V1 \cdot V2 \cdot V3 \cdot \sqrt{3}} \quad (22)$$

Because α/r is a constant, obtaining this value in advance can obtain θx and θy from the above relationship equations.

Although three electrodes of the position indicator are provided at the tip part of the chassis 36 in the present embodiment example, they may be provided on the core like in the first embodiment example.

In the present embodiment example, rotation angle and tilt of the position indicator can be detected. Therefore, it is possible to shape the tip part in an asymmetric (non-symmetric) shape like those shown in FIG. 21 for example; then, software may be used to generate (detect user input of) drawings according to the obtained rotation angle and tilt.

It should be understood by those skilled in the art that various modifications, combinations, sub-combinations and alterations may occur depending on design requirements and other factors insofar as they are within the scope of the appended claims or the equivalents thereof.

What is claimed is:

1. A position detecting system comprising:
    a pen-shaped position indicator including an axial core made of non-conductive material and having an external surface defining a cross-sectional shape, a first electrode which is elongated to extend along an axis of the pen-shaped position indicator and is embedded in the external surface such that a perimeter of the first electrode fits within the cross-sectional shape of the axial core, and a second electrode which is elongated to extend along the axis of the pen-shaped position indicator and is embedded in the external surface such that a perimeter of the second electrode fits within the cross-sectional shape of the axial core, the first and second electrodes being separated from each other to interpose the axial core in between in the cross-sectional shape such that no electrode is present on the axis, wherein the axis is a central longitudinal axis of the pen-shaped position indicator; and
    a sensor controller of a position sensor surface configured to capacitively couple with the first electrode and the second electrode of the pen-shaped position indicator;
    wherein, in a first time period, the pen-shaped position indicator transmits first signals from the first electrode and the second electrode;
    in a second time period different from the first time period, the pen-shaped position indicator transmits a second signal from only one of the first electrode and the second electrode; and
    the sensor controller, in operation, calculates a first position of the pen-shaped position indicator relative to the sensor surface based on the first signals, calculates a second position of the pen-shaped position indicator relative to the sensor surface based on the second signal, determines a position of a tip of the pen-shaped position indicator from the first position, and
    determines a rotation angle of the pen-shaped position indicator based on the first position and the second position.

2. The position detecting system of claim 1, wherein the first electrode and the second electrode are arranged with point symmetry about the axis of the pen-shaped position indicator, and the sensor controller, in response to the axis of the pen-shaped position indicator being perpendicular to the sensor surface, determines the first position calculated based on the first signals as the position of the tip of the pen-shaped position indicator.

3. The position detecting system of claim 1, wherein the axial core is configured to be axially movable along the axis of the pen-shaped position indicator.

4. The position detecting system of claim 1, wherein the pen-shaped position indicator includes a pen-shaped chassis and the axial core extends along an axis of the pen-shaped chassis.

5. The position detecting system of claim 4, wherein the first electrode and the second electrode are arranged with point symmetry about the axis of the pen-shaped position indicator.

6. A pen-shaped position indicator comprising:
    an axial core made of non-conductive material and having an external surface defining a cross-sectional shape;
    a first electrode which is elongated to extend along an axis of the pen-shaped position indicator and is embedded in the external surface such that a perimeter of the first electrode fits within the cross-sectional shape of the axial core;
    a second electrode which is elongated to extend along the axis of the pen-shaped position indicator and is embedded in the external surface such that a perimeter of the second electrode fits within the cross-sectional shape of the axial core, the first and second electrodes being separated from each other to interpose the axial core in between in the cross-sectional shape such that no electrode is present on the axis, wherein the axis is a central longitudinal axis of the pen-shaped position indicator;

a controller configured to cause transmission of first signals from the first electrode and the second electrode in a first time period, and to cause transmission of a second signal from only one of the first electrode and the second electrode in a second time period different from the first time period;

wherein the first signals, when received by a sensor controller of a position sensor surface configured to capacitively couple with the first electrode and the second electrode, indicate a first position of the pen-shaped position indicator relative to the sensor surface, and the second signal, when received by the sensor controller, indicates a second position of the pen-shaped position indicator relative to the sensor surface.

7. The pen-shaped position indicator of claim 6, wherein the first electrode and the second electrode are arranged with point symmetry about the axis of the pen-shaped position indicator.

8. The pen-shaped position indicator of claim 6, wherein the axial core is configured to be axially movable along the axis of the pen-shaped position indicator.

9. The pen-shaped position indicator of claim 6, wherein the pen-shaped position indicator includes a pen-shaped chassis and the axial core extends along an axis of the pen-shaped chassis.

10. The pen-shaped position indicator of claim 9, wherein the first electrode and the second electrode are arranged with point symmetry about the axis of the pen-shaped position indicator.

11. A method comprising:
transmitting, from a first electrode and a second electrode of a pen-shaped position indicator in a first time period, first signals,
wherein the pen-shaped position indicator includes an axial core made of non-conductive material and having an external surface defining a cross-sectional shape, the first electrode is elongated to extend along an axis of the pen-shaped position indicator and is embedded in the external surface such that a perimeter of the first electrode fits within the cross-sectional shape of the axial core, and the second electrode is elongated to extend along the axis of the pen-shaped position indicator and is embedded in the external surface such that a perimeter of the second electrode fits within the cross-sectional shape of the axial core, the first and second electrodes being separated from each other to interpose the axial core in between in the cross-sectional shape such that no electrode is present on the axis, wherein the axis is a central longitudinal axis of the pen-shaped position indicator;

transmitting, from only one of the first electrode and the second electrode of the pen-shaped position indicator in a second time period different from the first time period, a second signal;

receiving, at a sensor controller of a position sensor surface configured to capacitively couple with the first electrode and the second electrode of the pen-shaped position indicator, the first signals and the second signal;

calculating, at the sensor controller, a first position of the pen-shaped position indicator relative to the sensor surface based on the first signals;

calculating, at the sensor controller, a second position of the pen-shaped position indicator relative to the sensor surface based on the second signal;

determining, at the sensor controller, a position of a tip of the pen-shaped position indicator from the first position; and determining, at the sensor controller, a rotation angle of the pen-shaped position indicator based on the first position and the second position.

12. The method of claim 11, wherein the first electrode and the second electrode are arranged with point symmetry about the axis of the pen-shaped position indicator, and the method comprises determining the first position calculated based on the first signals as the position of the tip of the pen-shaped position indicator when the axis of the pen-shaped position indicator is perpendicular to the sensor surface.

13. The method of claim 11, wherein the axial core is configured to be axially movable along the axis of the pen-shaped position indicator.

14. The method of claim 11, wherein the pen-shaped position indicator includes a pen-shaped chassis and the axial core extends along an axis of the pen-shaped chassis.

15. The method of claim 14, wherein the first electrode and the second electrode are arranged with point symmetry about the axis of the pen-shaped position indicator.

* * * * *